US 12,444,207 B2

United States Patent
Kawanai et al.

(10) Patent No.: US 12,444,207 B2
(45) Date of Patent: Oct. 14, 2025

(54) AUTOMATED DRIVING MANAGEMENT SYSTEM AND AUTOMATED DRIVING MANAGEMENT METHOD

(71) Applicant: TOYOTA JIDOSHA KABUSHIKI KAISHA, Toyota (JP)

(72) Inventors: Taichi Kawanai, Susono (JP); Yusuke Hayashi, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/222,520

(22) Filed: Jul. 17, 2023

(65) Prior Publication Data
US 2024/0029450 A1 Jan. 25, 2024

(30) Foreign Application Priority Data
Jul. 25, 2022 (JP) .................. 2022-118084

(51) Int. Cl.
*B60W 60/00* (2020.01)
*G06V 20/56* (2022.01)

(52) U.S. Cl.
CPC .......... *G06V 20/588* (2022.01); *B60W 60/00* (2020.02); *B60W 2420/403* (2013.01);
(Continued)

(58) Field of Classification Search
CPC ............. G06V 20/588; B60W 60/00; B60W 2554/20; B60W 2556/40; B60W 2554/40; B60W 2420/408; B60W 2420/403
(Continued)

(56) References Cited

U.S. PATENT DOCUMENTS

2016/0282874 A1 9/2016 Kurata et al.
2017/0299397 A1* 10/2017 Ichikawa ................ B60R 11/04
(Continued)

FOREIGN PATENT DOCUMENTS

JP 2018-040693 A 3/2018
JP 2021-128459 A 9/2021
(Continued)

OTHER PUBLICATIONS

Thorsten Schulz, Laser Scanning and Noise Reduction Applied to 3D Road Surface Analysis, Proc. of the Optical, 2005 (Year: 2005).*

*Primary Examiner* — Matthias S Weisfeld
(74) *Attorney, Agent, or Firm* — Dinsmore & Shohl LLP

(57) ABSTRACT

An automated driving management system is applied to a vehicle that performs automated driving by using a perception sensor. The automated driving management system acquires first sensor perception information indicating a result of perception by the perception sensor. Reference information indicates a correspondence relationship between a vehicle position and expected sensor perception information that is the first sensor perception information expected when an automated driving condition is satisfied. Based on the reference information, the automated driving management system acquires the expected sensor perception information associated with a determination target position. The automated driving management system determines whether or not the automated driving condition is satisfied at the determination target position by comparing the first sensor perception information acquired at the determination target position with the expected sensor perception information associated with the determination target position.

10 Claims, 16 Drawing Sheets

(52) U.S. Cl.
CPC ... *B60W 2420/408* (2024.01); *B60W 2554/20* (2020.02); *B60W 2554/40* (2020.02); *B60W 2556/40* (2020.02)

(58) Field of Classification Search
USPC .......................................................... 701/23
See application file for complete search history.

(56) References Cited

U.S. PATENT DOCUMENTS

| | | | |
|---|---|---|---|
| 2018/0066960 | A1 | 3/2018 | Tateishi et al. |
| 2020/0249670 | A1* | 8/2020 | Takemura .............. G01C 21/38 |
| 2021/0248386 | A1 | 8/2021 | Takato |
| 2022/0107391 | A1* | 4/2022 | Ren ........................ G06V 20/58 |
| 2022/0197301 | A1* | 6/2022 | Moawad ............... G01S 13/876 |
| 2022/0350025 | A1* | 11/2022 | Sachdev ................. G01S 17/89 |
| 2023/0056501 | A1* | 2/2023 | Yu .......................... G06V 20/58 |
| 2023/0122320 | A1* | 4/2023 | Sun ...................... G01S 7/4863 |
| | | | 356/4.01 |
| 2023/0356755 | A1 | 11/2023 | Tang et al. |
| 2024/0004031 | A1* | 1/2024 | Bansal ................... G01S 7/411 |

FOREIGN PATENT DOCUMENTS

| | | | | |
|---|---|---|---|---|
| JP | 2021-187324 A | | 12/2021 | |
| WO | 2015/068249 A1 | | 5/2015 | |
| WO | 2022/064877 A1 | | 3/2022 | |
| WO | WO-2025013609 A1 * | | 1/2025 | .............. G08G 1/16 |

\* cited by examiner

AUTOMATED DRIVING MANAGEMENT SYSTEM AND AUTOMATED DRIVING MANAGEMENT METHOD

CROSS-REFERENCE TO RELATED APPLICATION

This application claims priority to Japanese Patent Application No. 2022-118084 filed on Jul. 25, 2022, the entire contents of which are incorporated by reference herein.

BACKGROUND

Technical Field

The present disclosure relates to a technique for managing automated driving of a vehicle. In particular, the present disclosure relates to a technique for determining whether or not an automated driving condition is satisfied.

Background Art

Patent Literature 1 discloses an autonomous traveling vehicle provided with a plurality of sensors. The autonomous traveling vehicle evaluates a state of dirt or failure of the sensors. When a sensor performance is degraded due to the dirt or failure, the autonomous traveling vehicle operates in a degenerate mode in which a speed and a steering angle are limited.

Patent Literature 2 discloses an electronic control device installed on a vehicle. The electronic control device determines a sensor detectable region based on detection information of a sensor installed on the vehicle. The electronic control device generates travel control information of the vehicle based on information detected by the sensor and a sensor detectable area.

LIST OF RELATED ART

Patent Literature 1: International Publication No. WO2015/068249
Patent Literature 2: Japanese Laid-Open Patent Application No. JP-2021-187324

SUMMARY

Automated driving of a vehicle is considered. An automated driving condition is a condition under which the automated driving of the vehicle is permitted, and is also referred to as an operational design domain (ODD). An automated driving system is designed to be operated under a predetermined automated driving condition (ODD). Therefore, when performing the automated driving, it is important to determine whether or not the automated driving condition is satisfied.

An object of the present disclosure is to provide a technique capable of more accurately determining whether or not an automated driving condition is satisfied.

A first aspect relates to an automated driving management system.

The automated driving management system is applied to a vehicle that performs automated driving by using a perception sensor for perceiving a surrounding situation.

The automated driving management system includes:
one or more processors configured to acquire first sensor perception information indicating a result of perception by the perception sensor; and
one or more memory devices configured to store reference information indicating a correspondence relationship between a vehicle position and expected sensor perception information that is the first sensor perception information expected when an automated driving condition is satisfied.

The one or more processors acquire, based on the reference information, the expected sensor perception information associated with a determination target position.

The one or more processors determine whether or not the automated driving condition is satisfied at the determination target position by comparing the first sensor perception information acquired at the determination target position with the expected sensor perception information associated with the determination target position.

A second aspect relates to an automated driving management method.

The automated driving management method is applied to a vehicle that performs automated driving by using a perception sensor for perceiving a surrounding situation.

First sensor perception information indicates a result of perception by the perception sensor.

Reference information indicates a correspondence relationship between a vehicle position and expected sensor perception information that is the first sensor perception information expected when an automated driving condition is satisfied.

The automated driving management method includes:
acquiring, based on the reference information, the expected sensor perception information associated with a determination target position; and
determining whether or not the automated driving condition is satisfied at the determination target position by comparing the first sensor perception information acquired at the determination target position with the expected sensor perception information associated with the determination target position.

According to the present disclosure, the reference information indicating the correspondence relationship between the vehicle position and the expected sensor perception information is prepared. The expected sensor perception information is the first sensor perception information (i.e., the result of perception by the perception sensor) expected when the automated driving condition is satisfied. Therefore, comparing the first sensor perception information acquired at the determination target position with the expected sensor perception information associated with the determination target position makes it possible to accurately determine whether or not the automated driving condition is satisfied at the determination target position.

EMBODIMENTS

Embodiments of the present disclosure will be described with reference to the accompanying drawings.

1. Overview 1-1. Vehicle Control System

Figure 1:
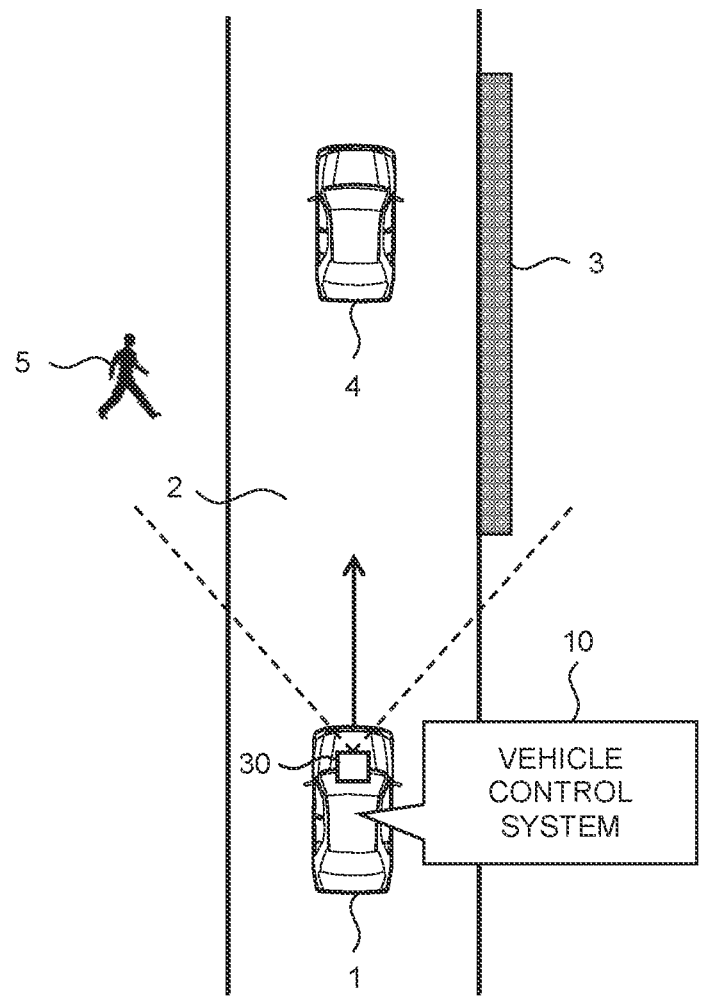
FIG. 1 is a conceptual diagram for explaining an overview of a vehicle and a vehicle control system according to an embodiment of the present disclosure.

FIG. 1 is a conceptual diagram for explaining an overview of a vehicle 1 and a vehicle control system 10 according to the present embodiment. The vehicle control system 10 controls the vehicle 1. Typically, the vehicle control system 10 is installed on the vehicle 1. Alternatively, at least a part of the vehicle control system 10 may be included in a remote system outside the vehicle 1 to remotely control the vehicle 1.

The vehicle 1 is capable of automated driving, and the vehicle control system is configured to control the automated driving of the vehicle 1. The automated driving supposed here is one where a driver may not necessarily 100% concentrate on the driving (e.g., so-called Level 3 or higher level automated driving). The automated driving level may be Level 4 or higher that does not need a driver.

In the automated driving of the vehicle 1, a perception sensor 30 mounted on the vehicle 1 is used. The perception sensor 30 is a sensor for perceiving a situation around the vehicle 1. Examples of the perception sensor 30 include a laser imaging detection and ranging (LIDAR), a camera, a radar, and the like. The LIDAR emits beams and detects a reflected beam reflected at a reflection point to measure a relative position of the reflection point.

The vehicle control system 10 uses the perception sensor 30 to perceive a situation around the vehicle 1. For example, the vehicle control system 10 uses the perception sensor 30 to perceive a stationary object and a moving object around the vehicle 1. Examples of the stationary object include a road surface 2, a road structure 3 (e.g., a wall, a guardrail, a curb), a white line, and the like. Examples of the moving object include a surrounding vehicle 4, a pedestrian 5, and the like. Then, the vehicle control system 10 executes automated driving control regarding the vehicle 1 based on a result of the perception processing using the perception sensor 30.

1-2. Automated Driving Condition

An automated driving condition is a condition under which the automated driving of the vehicle 1 is permitted. The automated driving condition is also referred to as an operational design domain (ODD) or an operation design domain. Generally, the automated driving condition is defined by a maximum vehicle speed, a traveling area, a weather condition, a sunshine condition, and the like. For example, in rainy weather, accuracy of the perception processing using the perception sensor 30 may decrease, and thus accuracy of the automated driving control may decrease. Therefore, conventionally, "a rainfall amount per unit time is less than a predetermined value (for example, 5 mm/h)" has been used as one of the automated driving condition related to the weather.

The vehicle control system 10 is designed to perform the automated driving under a predetermined automated driving condition (ODD). Therefore, when performing the automated driving, it is important to determine whether or not the automated driving condition is satisfied. A process of determining whether or not the automated driving condition is satisfied is hereinafter referred to as an "ODD suitability determination process." The inventor of the present application has recognized the following problem regarding the ODD suitability determination process.

As an example, the above-mentioned automated driving condition related to the weather, "a rainfall amount per unit time is less than a predetermined value" is considered. The rainfall amount varies widely even in a relatively narrow area, and local torrential rain has increased in recent years. Therefore, it is not easy to accurately pinpoint the rainfall amount at a current position of the vehicle 1. In order to increase accuracy of measurement of the local rainfall amount, a large-scale infrastructure such as deployment of a large number of rainfall amount sensors is required. This is not desirable from a viewpoint of costs. In addition, when the sun shines under a wet road surface condition after rain, reflection of light from the wet road surface increases. In this case, accuracy of perception of the road surface and a fallen object by the perception sensor 30 may decrease. That is, even when it is not raining, there is a possibility that an environment around the vehicle 1 is not desirable for the automated driving. Therefore, performing the ODD suitability determination process based on a simple comparison between the rainfall amount and a threshold value is not necessarily appropriate from a viewpoint of the accuracy of the automated driving control.

In a case of a weather that is difficult to measure such as fog, difficulty of the ODD suitability determination process further increases.

In addition, not only the natural environment such as the weather but also aging or performance deterioration of the perception sensor 30 itself affects the accuracy of the automated driving control. It is necessary to perform the ODD suitability determination process in consideration of various factors that affect the accuracy of the automated driving control.

In view of the above, the present disclosure proposes a new technique capable of improving the accuracy of the ODD suitability determination process.

1-3. New ODD Suitability Determination Process

First, a technical concept of the new ODD suitability determination process according to the present embodiment will be described.

As described above, it is not necessarily appropriate to perform the ODD suitability determination process using a parameter such as the rainfall amount that specifically defines the weather itself. A human driver does not decide whether it is easy or difficult to drive by looking at the specific parameter such as the rainfall amount. The human driver decides whether it is easy or difficult to drive based on information perceived by the human driver's own vision. For example, when the sun shines under a wet road surface condition after rain, reflection of light from the wet road surface is so bright that the road surface cannot be seen as usual, and thus the human driver decides that it is difficult to drive. That is, the human driver decides that it is difficult to drive, when the information perceived by the human driver's own vision is different from usual one.

The ODD suitability determination process according to the present embodiment also is performed in the same manner as a sense of the human driver. An "eye" for the vehicle control system 10 that performs the automated driving control is the perception sensor 30. Therefore, according to the present embodiment, the ODD suitability determination process is performed based on the result of perception by the perception sensor 30. That is, the ODD suitability determination process is performed based on whether "appearance" viewed from the perception sensor 30 of the vehicle 1 is as usual or not.

Figure 2:
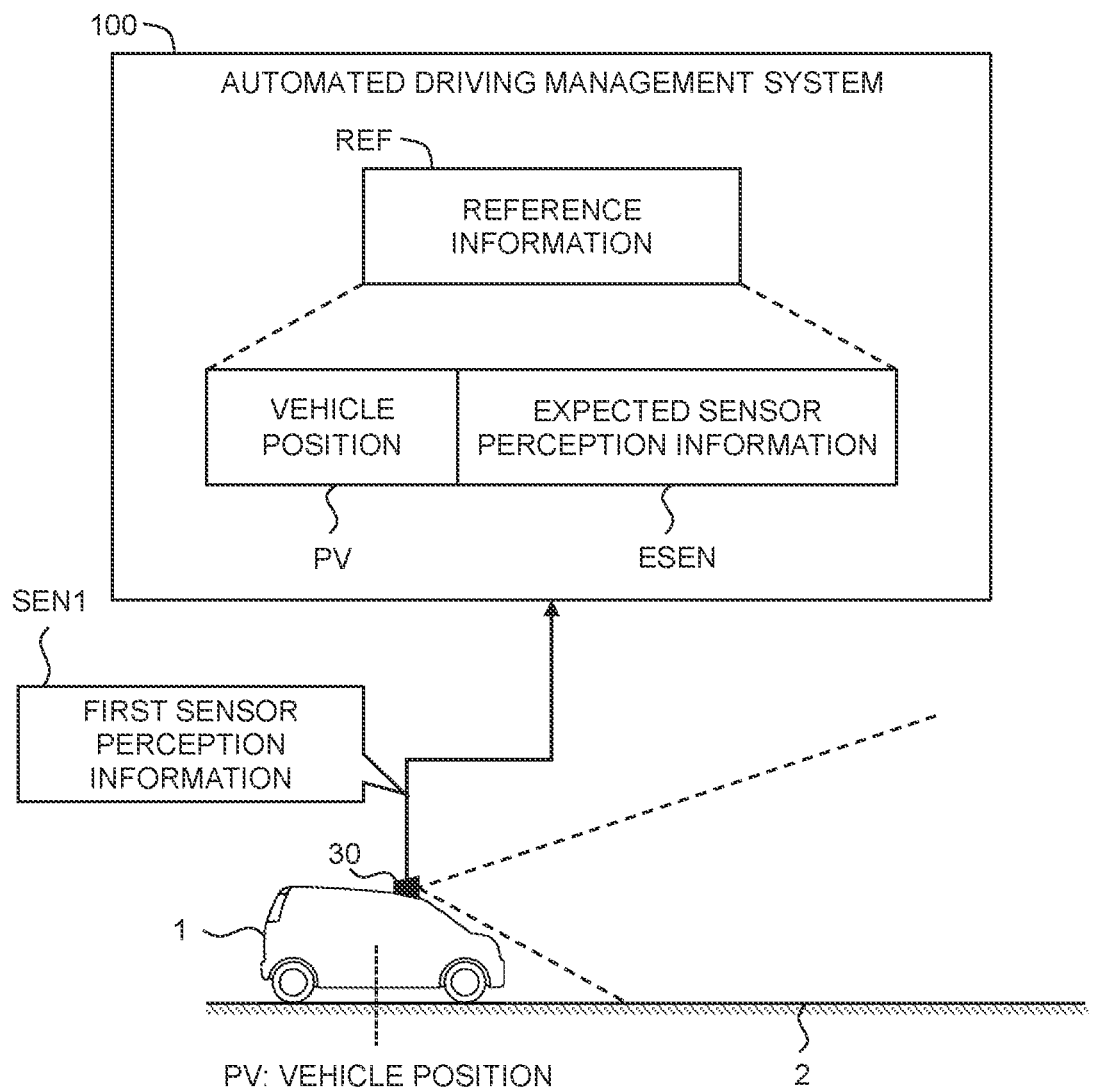
FIG. 2 is a conceptual diagram for explaining an overview of an ODD suitability determination process according to an embodiment of the present disclosure.

FIG. 2 is a conceptual diagram for explaining an overview of the ODD suitability determination process according to the present embodiment. "First sensor perception information SEN1" indicates the result of perception by the perception sensor 30 mounted on the vehicle 1. That is, the first sensor perception information SEN1 corresponds to the "appearance" viewed from the perception sensor 30. For example, when the perception sensor 30 includes the LIDAR, the first sensor perception information SEN1 includes information of a point cloud (beam reflection points) measured by the LIDAR. For example, the first sensor perception information SEN1 includes the number of beam reflection points on the road surface 2 measured during one frame.

Typically, the first sensor perception information SEN1 includes information on a stationary object (e.g., the road surface 2, the road structure 3) perceived by the perception sensor 30. On the other hand, information on a moving object (e.g., the surrounding vehicle 4, the pedestrian 5) perceived by the perception sensor 30 may not necessarily be included in the first sensor perception information SEN1. For convenience sake, the information on the moving object perceived by the perception sensor 30 is hereinafter referred to as "second sensor perception information." The second sensor perception information is necessary for the automated driving control by the vehicle control system 10, but may not necessarily be included in the first sensor perception information SEN1.

"Expected sensor perception information ESEN" is the first sensor perception information SEN1 expected when the automated driving condition is satisfied. The automated driving condition is determined in advance in consideration of various factors that affect the accuracy of the automated driving control. The expected sensor perception information ESEN corresponds to "appearance" viewed from the perception sensor 30 in the case where the automated driving is permissible.

"Reference information REF" indicates a correspondence relationship between a vehicle position PV and the expected sensor perception information ESEN. That is, the reference information REF indicates the expected sensor perception information ESEN as a function of the vehicle position PV. It can also be said that the reference information REF indicates the expected sensor perception information ESEN when the vehicle 1 is present at the vehicle position PV.

The vehicle position PV may be set along a general vehicle travel trajectory in a road. The vehicle position PV may be assumed to be located at a lane center. The vehicle position PV may be a concept including both a position and a direction of the vehicle 1. The direction of the vehicle 1 may be assumed to be parallel to an extending direction of a lane (white line).

The expected sensor perception information ESEN and the reference information REF are generated and updated based on information acquired when the automated driving condition is satisfied. For example, the expected sensor perception information ESEN and the reference information REF are generated and updated based on past automated driving records of one or more vehicles 1. In this case, it can be said that the expected sensor perception information ESEN and the reference information REF represent "past successful experiences." As another example, the reference information REF may be generated and updated through a simulation based on configuration information of an automated driving area and design information of the perception sensor 30.

It can be said that the reference information REF that represents the expected sensor perception information ESEN as a function of the vehicle position PV is a kind of map information. However, it should be noted that the reference information REF is a concept that is totally different from general map information. The general map information indicates an arrangement of objects in an absolute coordinate system. That is, the general map information indicates a correspondence relationship between an absolute position and an object present at the absolute position. On the other hand, the reference information REF indicates a correspondence relationship between the vehicle position PV and the first sensor perception information SEN1 (i.e., the result of perception) as viewed from the vehicle position PV when the automated driving condition is satisfied. The reference information REF does not indicate an object present at the vehicle position PV.

An automated driving management system 100 is applied to the vehicle 1 and manages the automated driving of the vehicle 1. The automated driving management system 100 holds the above-described reference information REF, and performs the ODD suitability determination process regarding the vehicle 1 based on the reference information REF. In particular, the automated driving management system 100 determines whether or not the automated driving condition is satisfied for the vehicle 1 present at a determination target position PT. Typically, the determination target position PT is the current position of the vehicle 1. As another example, the determination target position PT may be a past position of the vehicle 1.

More specifically, the automated driving management system 100 acquires the first sensor perception information SEN1 acquired by the vehicle 1 (i.e., the vehicle control system 10) at the determination target position PT. In addition, the automated driving management system 100 acquires, based on the reference information REF, the expected sensor perception information ESEN associated with the determination target position PT. The expected sensor perception information ESEN associated with the determination target position PT is the first sensor perception information SEN1 expected at the determination target position PT when the automated driving condition is satisfied. Therefore, the automated driving management system 100 is able to determine whether or not the automated driving condition is satisfied at the determination target position PT by comparing the first sensor perception information SEN1 acquired at the determination target position PT with the expected sensor perception information ESEN associated with the determination target position PT. When the first sensor perception information SEN1 acquired at the determination target position PT is significantly different from the expected sensor perception information ESEN associated with the determination target position PT, the automated driving management system 100 determines that the automated driving condition is not satisfied at the determination target position PT.

Figure 3:
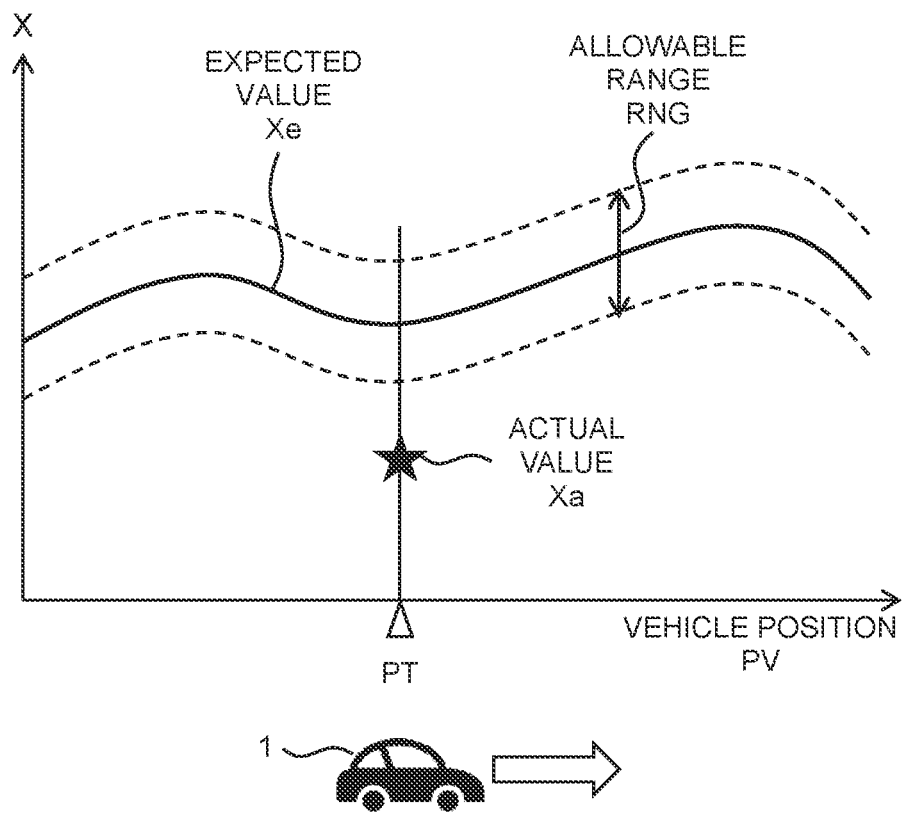
FIG. 3 is a diagram for explaining an example of an ODD suitability determination process according to an embodiment of the present disclosure.

FIG. 3 is a diagram for explaining an example of the ODD suitability determination process according to the present embodiment. In FIG. 3, a horizontal axis represents the vehicle position PV and a vertical axis represents a parameter X. The parameter X is a parameter indicating the result of perception by the perception sensor 30 and is included in the first sensor perception information SEN1. For example, the parameter X is the number of beam reflection points on the road surface 2 measured by the LIDAR.

The expected sensor perception information ESEN includes an expected value Xe of the parameter X expected when the automated driving condition is satisfied. For example, the expected value Xe is an average value of a large number of parameters X acquired when the automated driving condition is satisfied. The reference information REF indicates a correspondence relationship between the expected value Xe of the parameter X and the vehicle position PV. That is, the reference information REF indicates the expected value Xe of the parameter X as a function of the vehicle position PV.

An allowable range RNG is a range of the parameter X in which the automated driving is allowed. The allowable range RNG includes at least the expected value Xe. A width of the allowable range RNG is predetermined. The width of the allowable range RNG may be set based on a standard deviation (a) of the large number of parameters X acquired when the automated driving condition is satisfied. A set of the expected value Xe and the allowable range RNG may be registered in the reference information REF.

The automated driving management system 100 acquires the first sensor perception information SEN1 acquired by the vehicle 1 (i.e., the vehicle control system 10) at the determination target position PT. The first sensor perception information SEN1 includes an actual value Xa of the parameter X acquired at the determination target position PT. In addition, based on the reference information REF, the automated driving management system 100 acquires the expected value Xe associated with the determination target position PT. Then, the automated driving management system 100 determines whether or not the automated driving condition is satisfied at the determination target position PT by comparing the actual value Xa of the parameter X acquired at the determination target position PT with the allowable range RNG including the expected value Xe associated with the determination target position PT. More specifically, when the actual value Xa acquired at the determination target position PT is within the allowable range RNG, the automated driving management system 100 determines that the automated driving condition is satisfied at the determination target position PT. On the other hand, when the actual value Xa acquired at the determination target position PT deviates from the allowable range RNG, the automated driving management system 100 determines that the automated driving condition is not satisfied at the determination target position PT.

For example, the parameter X is the number of beam reflection points on the road surface 2 measured by the LIDAR. The expected value Xe is an expected value of the number of beam reflection points on the road surface 2 when the automated driving condition is satisfied. In rainy weather, the number of beam reflection points on the road surface 2 decreases conspicuously. When the number of beam reflection points on the road surface 2 falls below the allowable range RNG including the expected value Xe, the automated driving management system 100 determines that the automated driving condition is not satisfied at the determination target position PT. That is, when the "appearance" of the road surface 2 viewed from the perception sensor of the vehicle 1 is different from usual, it is determined that the automated driving condition is not satisfied.

When the determination target position PT is the current position of the vehicle 1 and it is determined that the automated driving condition is not satisfied at the determination target position PT, the automated driving management system 100 decelerates or stops the vehicle 1. For example, the automated driving management system 100 instructs the vehicle control system 10 to decelerate or stop the vehicle 1.

1-4. Various Forms of Automated Driving Management System

The automated driving management system 100 may be included in the vehicle control system 10 of the vehicle 1 or may be provided separately from the vehicle control system 10. The automated driving management system 100 may be a management server that communicates with the vehicle 1 (the vehicle control system 10). The automated driving management system 100 and the vehicle control system 10 may be partially common.

Figure 4:
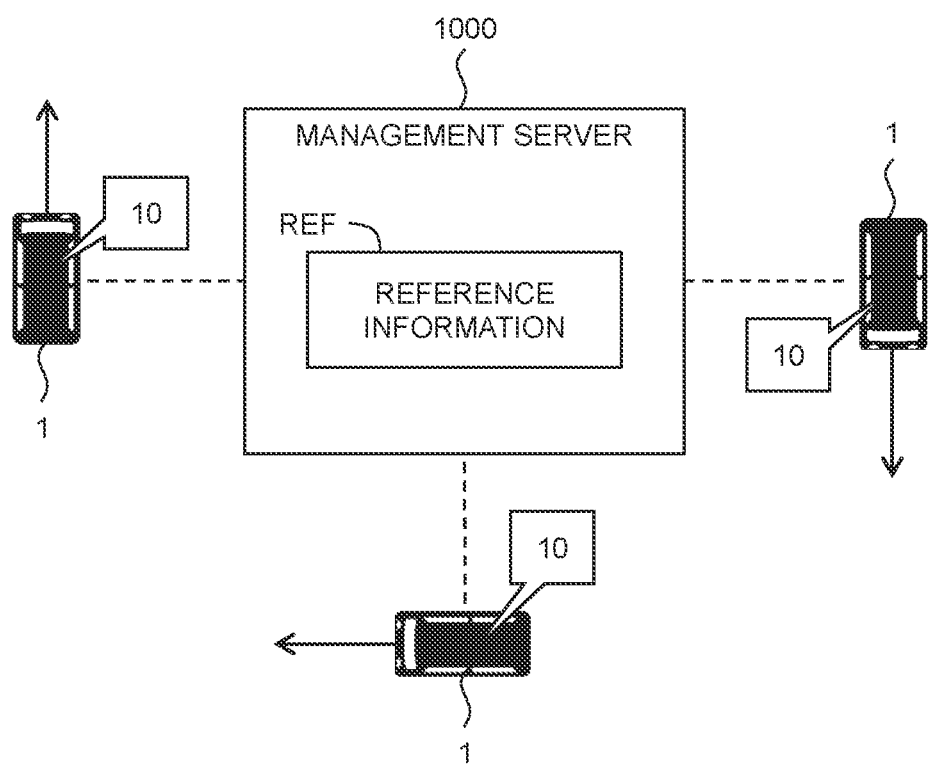
FIG. 4 is a conceptual diagram for explaining a management server according to an embodiment of the present disclosure.

FIG. 4 is a conceptual diagram for explaining a management server 1000 that manages the automated driving. The management server 1000 may be configured by a plurality of servers that execute distributed processing. The management server 1000 is communicably connected to a large number of vehicles 1 that perform the automated driving. The management server 1000 collects the vehicle positions PV and the first sensor perception information SEN1 from the large number of vehicles 1. In particular, the management server 1000 collects the vehicle positions PV and the first sensor perception information SEN1 in the case where the automated driving is possible from the large number of vehicles 1. Then, the management server 1000 generates and updates the above-described reference information REF based on the information collected from the large number of vehicles 1.

For example, the automated driving management system 100 is included in the management server 1000. In this case, the management server 1000 communicates with the vehicle 1 being a determination target and acquires information of the determination target position PT and the first sensor perception information SEN1 acquired at the determination target position PT. Then, the management server 1000 performs the above-described ODD suitability determination process based on the information acquired from the vehicle 1 being the determination target and the reference information REF. When it is determined that the automated driving condition is not satisfied at the determination target position PT, the management server 1000 instructs the vehicle control system 10 of the vehicle 1 being the determination target to decelerate or stop.

As another example, the automated driving management system 100 may be included in the vehicle control system 10. In this case, the vehicle control system 10 communicates with the management server 1000 and acquires the reference information REF from the management server 1000. In addition, the vehicle control system 10 acquires the first sensor perception information SEN1 at the determination target position PT. Then, the vehicle control system 10 performs the above-described ODD suitability determination process based on the first sensor perception information SEN1 and the reference information REF. When it is determined that the automated driving condition is not satisfied at the determination target position PT, the vehicle control system 10 decelerates or stops the vehicle 1.

Generalization is as follows. The automated driving management system 100 includes one or more processors and one or more memory devices. The one or more processors may be included in the vehicle control system 10, may be included in the management server 1000, or may be distributed to the vehicle control system 10 and the management server 1000. The one or more memory devices may be included in the vehicle control system 10, may be included in the management server 1000, or may be distributed to the vehicle control system 10 and the management server 1000. The one or more memory devices store the reference information REF. The one or more processors acquire the first sensor perception information SEN1 and performs the ODD suitability determination process based on the first sensor perception information SEN1 and the reference information REF.

1-4. Effects

As described above, according to the present embodiment, the reference information REF indicating the correspondence relationship between the expected sensor perception information ESEN and the vehicle position PV is prepared. The expected sensor perception information ESEN is the first sensor perception information SEN1 (i.e., the result of perception by the perception sensor 30) expected when the automated driving condition is satisfied. Therefore, comparing the first sensor perception information SEN1 acquired at the determination target position PT with the expected sensor perception information ESEN associated with the determination target position PT makes it possible to accurately determine whether or not the automated driving condition is satisfied at the determination target position PT. For example, as compared with a case where a parameter specifically defining the weather itself such as the rainfall amount is used, it is possible to more accurately determine whether or not the automated driving condition is satisfied.

In addition, not only the natural environment such as the weather but also aging or the performance deterioration of the perception sensor 30 itself affects the accuracy of the automated driving control. It is necessary to perform the ODD suitability determination process in consideration of various factors that affect the accuracy of the automated driving control. The expected sensor perception information ESEN according to the present embodiment is the first sensor perception information SEN1 (i.e., the result of perception by the perception sensor 30) expected when the automated driving condition is satisfied. Therefore, the various factors that affect the accuracy of the automated driving control are integrally reflected in the expected sensor perception information ESEN. Using such the expected sensor perception information ESEN and the reference information REF makes it possible to perform the ODD suitability determination process easily and with high accuracy.

Hereinafter, specific examples of the vehicle control system 10, the automated driving management system 100, and the ODD suitability determination process according to the present embodiment will be described.

2. Example of Vehicle Control System

2-1. Configuration Example

Figure 5:
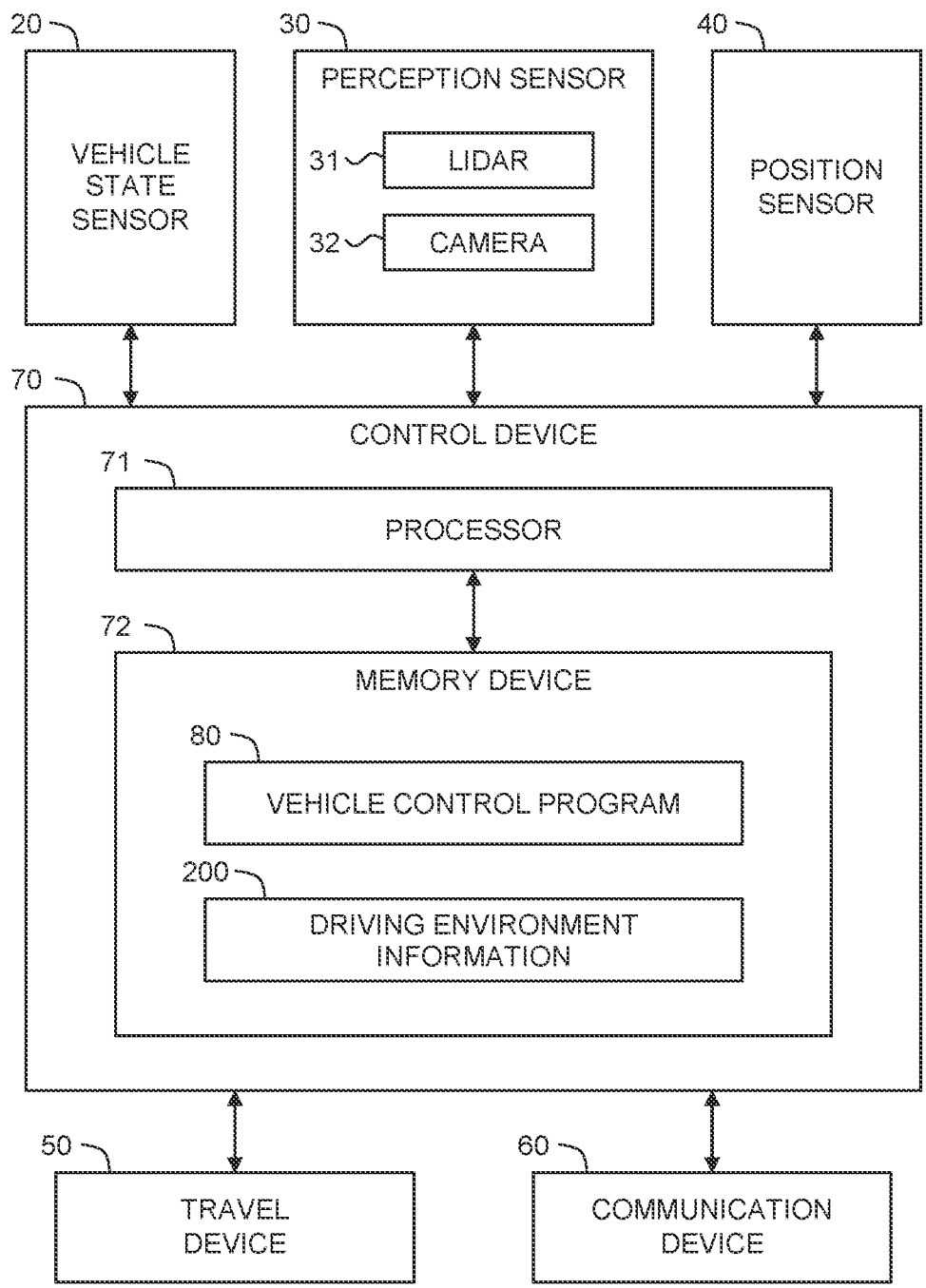
FIG. 5 is a block diagram showing a configuration example of a vehicle control system according to an embodiment of the present disclosure.

FIG. 5 is a block diagram showing a configuration example of the vehicle control system 10 according to the present embodiment. The vehicle control system 10 includes a vehicle state sensor 20, a perception sensor 30, a position sensor 40, a travel device 50, a communication device 60, and a control device 70.

The vehicle state sensor 20 detects a state of the vehicle 1. For example, the vehicle state sensor 20 includes a speed sensor, an acceleration sensor, a yaw rate sensor, a steering angle sensor, and the like.

The perception sensor 30 perceives (detects) a situation around the vehicle 1. The perception sensor 30 includes a LIDAR 31, a camera 32, a radar, and the like. The LIDAR 31 emits beams and detects a reflected beam reflected at a reflection point to measure a relative position of the reflection point. The camera 32 images a situation around the vehicle 1 to acquire an image.

The position sensor 40 detects a position and an orientation of the vehicle 1. Examples of the position sensor 40 include an inertial measurement unit (IMU), a global navigation satellite system (GNSS) sensor, and the like.

The travel device 50 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force.

The communication device 60 communicates with the outside of the vehicle 1. For example, the communication device 60 communicates with the management server 1000 (see FIG. 4).

The control device (controller) 70 is a computer that controls the vehicle 1. The control device 70 includes one or more processors 71 (hereinafter simply referred to as a processor 71) and one or more memory devices 72 (hereinafter simply referred to as a memory device 72). The processor 71 executes a variety of processing. For example, the processor 71 includes a central processing unit (CPU). The memory device 72 stores a variety of information. Examples of the memory device 72 include a volatile memory, a nonvolatile memory, a hard disk drive (HDD), a solid state drive (SSD), and the like. The control device 70 may include one or more electronic control units (ECUs). A part of the control device 70 may be an information processing device outside the vehicle 1. In this case, a part of the control device 70 communicates with the vehicle 1 and remotely controls the vehicle 1.

A vehicle control program 80 is a computer program for controlling the vehicle 1. The variety of processing by the control device 70 may be implemented by the processor 71 executing the vehicle control program 80. The vehicle control program is stored in the memory device 72. The vehicle control program 80 may be recorded on a non-transitory computer-readable recording medium.

2-2. Driving Environment Information

Figure 6:
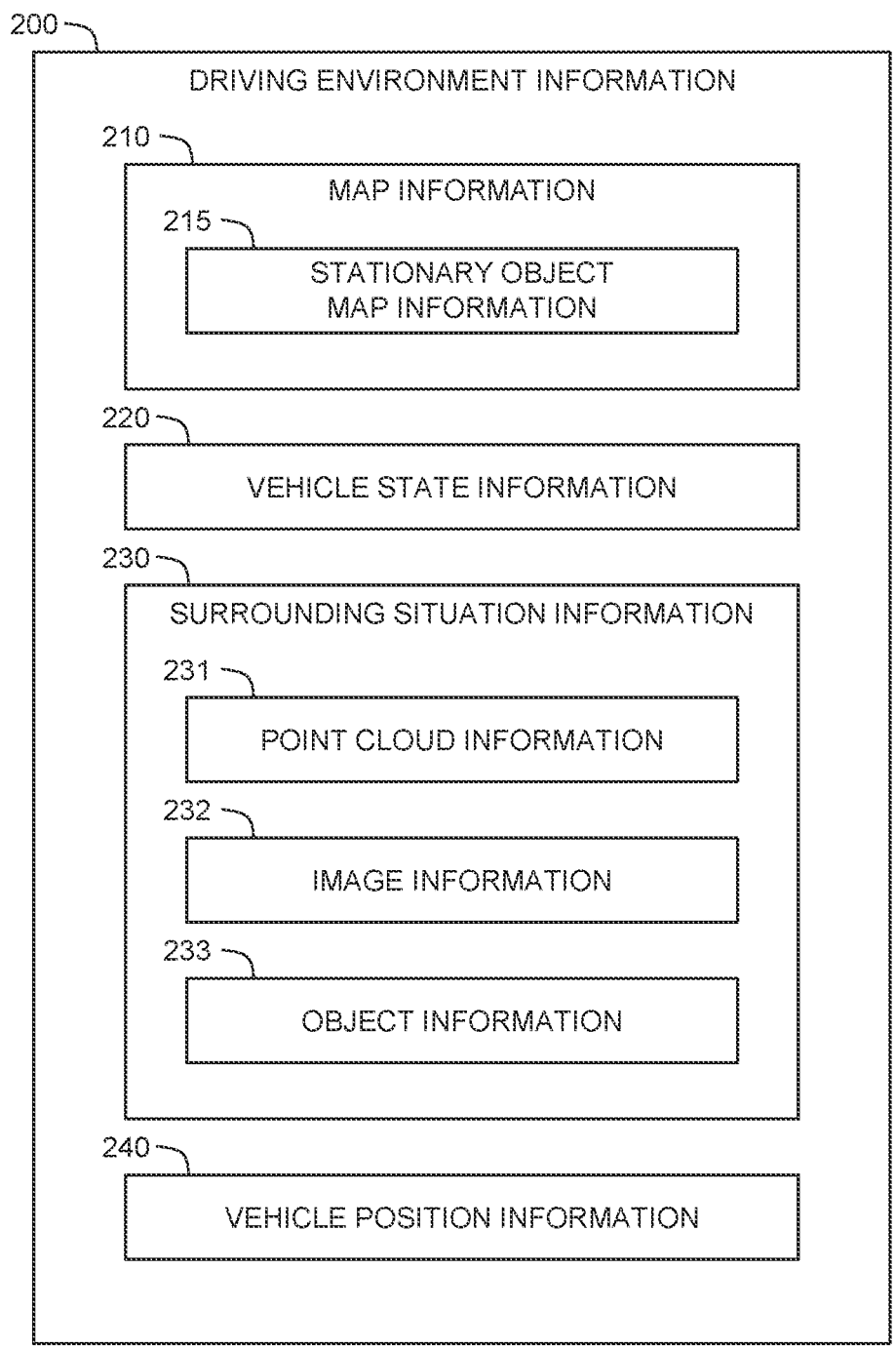
FIG. 6 is a block diagram showing an example of driving environment information according to an embodiment of the present disclosure.

The control device 70 acquires driving environment information 200 indicating a driving environment for the vehicle 1. The driving environment information 200 is stored in the memory device 72. FIG. 6 is a block diagram showing an example of the driving environment information 200. The driving environment information 200 includes map information 210, vehicle state information 220, surrounding situation information 230, and vehicle position information 240.

2-2-1. Map Information

The map information 210 includes a general navigation map. The map information 210 may indicate a lane configuration and a road shape. The map information 210 may include position information of landmarks, traffic signals, signs, and so forth. The control device 70 acquires the map information 210 of a necessary area from a map database. The map database may be stored in the memory device 72 or may be managed by the management server 1000. In the latter case, the control device 70 communicates with the management server 1000 via the communication device 60 to acquire the necessary map information 210.

The map information 210 may include stationary object map information 215 indicating an absolute position where a stationary object is present. Examples of the stationary object include a road surface 2, a road structure 3, and the like. Examples of the road structure 3 include a wall, a guardrail, a curb, a fence, a plant, and the like.

The stationary object map information 215 may include terrain map information indicating an absolute position (latitude, longitude, and altitude) where the road surface 2 is present. The terrain map information may include an evaluation value set for each absolute position. The evaluation value indicates "certainty (likelihood)" that the road surface 2 is present at the absolute position.

The stationary object map information 215 may include road structure map information indicating an absolute position where the road structure 3 is present. The road structure map information may include an evaluation value set for each absolute position. The evaluation value indicates "certainty (likelihood)" that the road structure 3 is present at the absolute position.

2-2-2. Vehicle State Information

The vehicle state information 220 is information indicating the state of the vehicle 1 and includes a vehicle speed, an acceleration, a yaw rate, a steering angle, and the like. The control device 70 acquires the vehicle state information 220 from the vehicle state sensor 20. The vehicle state information 220 may indicate a driving state (automated driving or manual driving) of the vehicle 1.

2-2-3. Surrounding Situation Information

The surrounding situation information 230 is information indicating the situation around the vehicle 1. The control device 70 perceives (recognizes) the situation around the vehicle 1 by using the perception sensor 30 to acquire the surrounding situation information 230.

For example, the surrounding situation information 230 includes point cloud information 231 indicating a result of measurement by the LIDAR 31. More specifically, the point cloud information 231 indicates a relative position (an azimuth and a distance) of each beam reflection point viewed from the LIDAR 31.

The surrounding situation information 230 may include image information 232 captured by the camera 32.

The surrounding situation information 230 further includes object information 233 regarding an object around the vehicle 1. Examples of the object include a white line, the road structure 3, a surrounding vehicle 4 (e.g., a preceding vehicle, a parked vehicle, and the like), a pedestrian 5, a traffic signal, a landmark, a fallen object, and the like. The object information 233 indicates a relative position and a relative speed of the object with respect to the vehicle 1. For example, analyzing the image information 232 captured by the camera 32 makes it possible to identify an object and calculate the relative position of the object. For example, the control device 70 identifies an object in the image information 232 by using image perception AI acquired by machine learning. It is also possible to identify an object and acquire the relative position and the relative speed of the object based on the point cloud information 231 acquired by the LIDAR 31.

In the object perception, the control device 70 may utilize the above-described stationary object map information 215. The position of the stationary object (e.g., the road surface 2, the road structure 3) is registered on the stationary object map information 215. Therefore, using the stationary object map information 215 makes it possible to distinguish the stationary object from other objects. More specifically, the control device 70 grasps the position of the stationary object existing around the vehicle 1 based on the stationary object map information 215 and the vehicle position information 240. Then, the control device 70 removes (thins out) the stationary object from the objects perceived using the perception sensor 30. It is thus possible to distinguish the stationary object from the other objects (e.g., a surrounding vehicle 4, a pedestrian 5, a fallen object, and the like). For example, the control device 70 is able to detect the surrounding vehicle 4, the pedestrian 5, the fallen object, and the like on the road surface 2 by removing the road surface 2 indicated by the terrain map information from the point cloud information 231.

2-2-4. Vehicle Position Information

The vehicle position information 240 is information indicating the position and the orientation of the vehicle 1. The control device 70 acquires the vehicle position information 240 from a result of detection by the position sensor 40. The control device 70 may acquire highly accurate vehicle position information 240 by a known self-position estimation process (localization) using the object information 233 and the map information 210.

Figure 7:
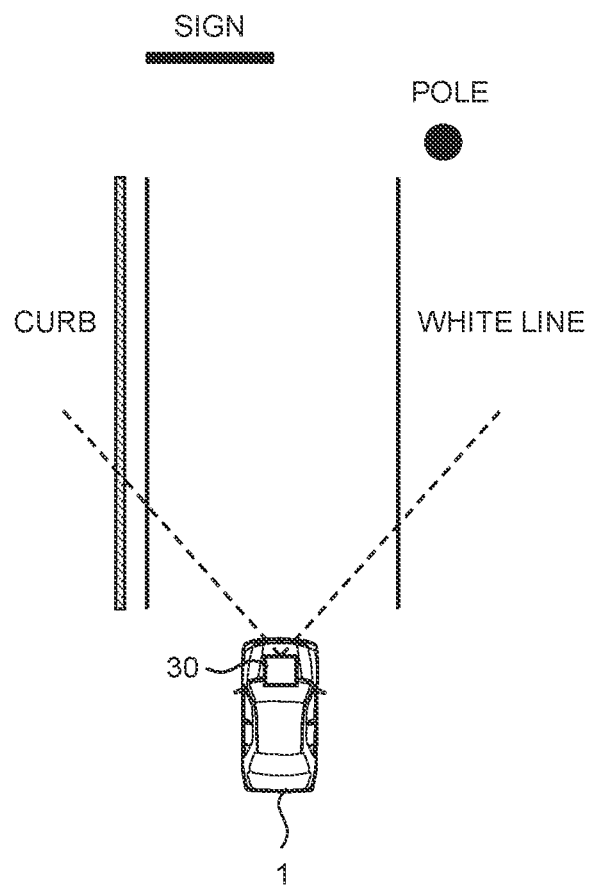
FIG. 7 is a conceptual diagram for explaining a localization process according to an embodiment of the present disclosure.

FIG. 7 is a conceptual diagram for explaining the self-position estimation process (localization). Various landmarks (characteristic objects) are present around the vehicle 1. Examples of the landmark include a white line, a curb, a sign, and a pole. The control device 70 uses the perception sensor 30 to perceive the landmark around the vehicle 1. The object information 233 indicates the relative position of the perceived landmark. Meanwhile, the absolute position of the landmark is registered on the map information 210. The control device 70 corrects the vehicle position information 240 such that the relative position of the landmark indicated by the object information 233 and the absolute position of the landmark acquired from the map information 210 are consistent with each other. As a result, highly accurate vehicle position information 240 can be acquired.

2-3. Vehicle Travel Control

The control device 70 executes vehicle travel control that controls travel of the vehicle 1. The vehicle travel control includes steering control, acceleration control, and deceleration control. The control device 70 executes the vehicle travel control by controlling the travel device 50. More specifically, the control device 70 executes the steering control by controlling the steering device. In addition, the control device 70 executes the acceleration control by controlling the driving device. Further, the control device 70 executes the deceleration control by controlling the braking device.

2-4. Automated Driving Control

The control device 70 executes the automated driving control based on the driving environment information 200. More specifically, the control device 70 generates a travel plan of the vehicle 1 based on the driving environment information 200. Examples of the travel plan include keeping a current travel lane, making a lane change, making a right or left turn, avoiding an obstacle, and the like. Further, based on the driving environment information 200, the control device 70 generates a target trajectory necessary for the vehicle 1 to travel in accordance with the travel plan. The target trajectory includes a target position and a target velocity. Then, the control device 70 executes the vehicle travel control such that the vehicle 1 follows the target trajectory.

It should be noted that when the automated driving management system 100 determines that the automated driving condition is not satisfied, the control device 70 generates an emergency plan for decelerating or stopping the vehicle 1. Then, the control device 70 executes the vehicle travel control in accordance with the emergency plan to make the vehicle 1 decelerate or stop.

3. Automated Driving Management System

3-1. Configuration Example

Figure 8:
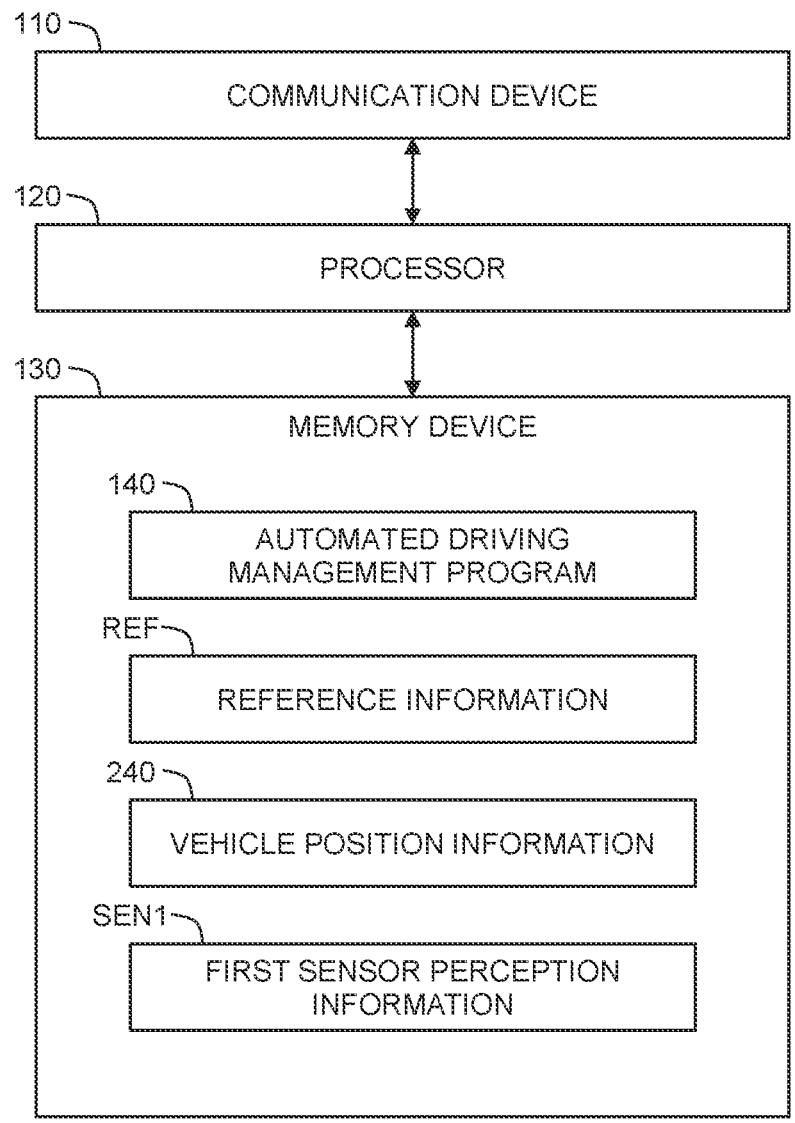
FIG. 8 is a block diagram showing a configuration example of an automated driving management system according to an embodiment of the present disclosure.

FIG. 8 is a block diagram showing a configuration example of the automated driving management system 100 according to the present embodiment. The automated driving management system 100 includes a communication device 110, one or more processors 120 (hereinafter simply referred to as a processor 120), and one or more memory devices 130 (hereinafter simply referred to as a memory device 130).

The communication device 110 communicates with the outside of the automated driving management system 100. For example, when the automated driving management system 100 is included in the vehicle control system 10, the communication device 110 communicates with the management server 1000 (see FIG. 4). As another example, when the automated driving management system 100 is included in the management server 1000, the communication device 110 communicates with the vehicle control system 10.

The processor 120 executes a variety of processing. For example, the processor 120 includes a CPU. The memory device 130 stores a variety of information. Examples of the memory device 130 include a volatile memory, a nonvolatile memory, an HDD, an SSD, and the like. When the automated driving management system 100 is included in the vehicle control system 10, the processor 120 is the same as the processor 71 of the vehicle control system 10, and the memory device 130 is the same as the memory device 72 of the vehicle control system 10.

An automated driving management program 140 is a computer program for managing the automated driving. The variety of processing by the processor 120 may be implemented by the processor 120 executing the automated driving management program 140. The automated driving management program 140 is stored in the memory device 130. The automated driving management program 140 may be recorded on a non-transitory computer-readable recording medium.

The reference information REF indicates a correspondence relationship between the expected sensor perception information ESEN and the vehicle position PV. The management server 1000 generates and updates the reference information REF. For example, the reference information REF is generated and updated based on past automated driving records of one or more vehicles 1. As another example, the reference information REF may be generated and updated through a simulation based on configuration information of an automated driving area and design information of the perception sensor 30. The reference information REF is stored in the memory device 130. When the automated driving management system 100 is included in the vehicle control system 10, the processor 120 communicates with the management server 1000 via the communication device 110 to acquire the reference information REF.

The vehicle position information 240 and the first sensor perception information SEN1 are acquired by the vehicle control system 10. The first sensor perception information SEN1 indicates the result of perception perceived by the perception sensor 30 of the vehicle 1. For example, the first sensor perception information SEN1 includes information on the stationary object (e.g., the road surface 2, the road structure 3) perceived by the perception sensor 30. When the automated driving management system 100 is included in the management server 1000, the processor 120 communicates with the vehicle control system 10 via the communication device 110 to acquire the vehicle position information 240 and the first sensor perception information SEN1. The vehicle position information 240 and the first sensor perception information SEN1 are stored in the memory device 130.

3-2. ODD Suitability Determination Process

Figure 9:
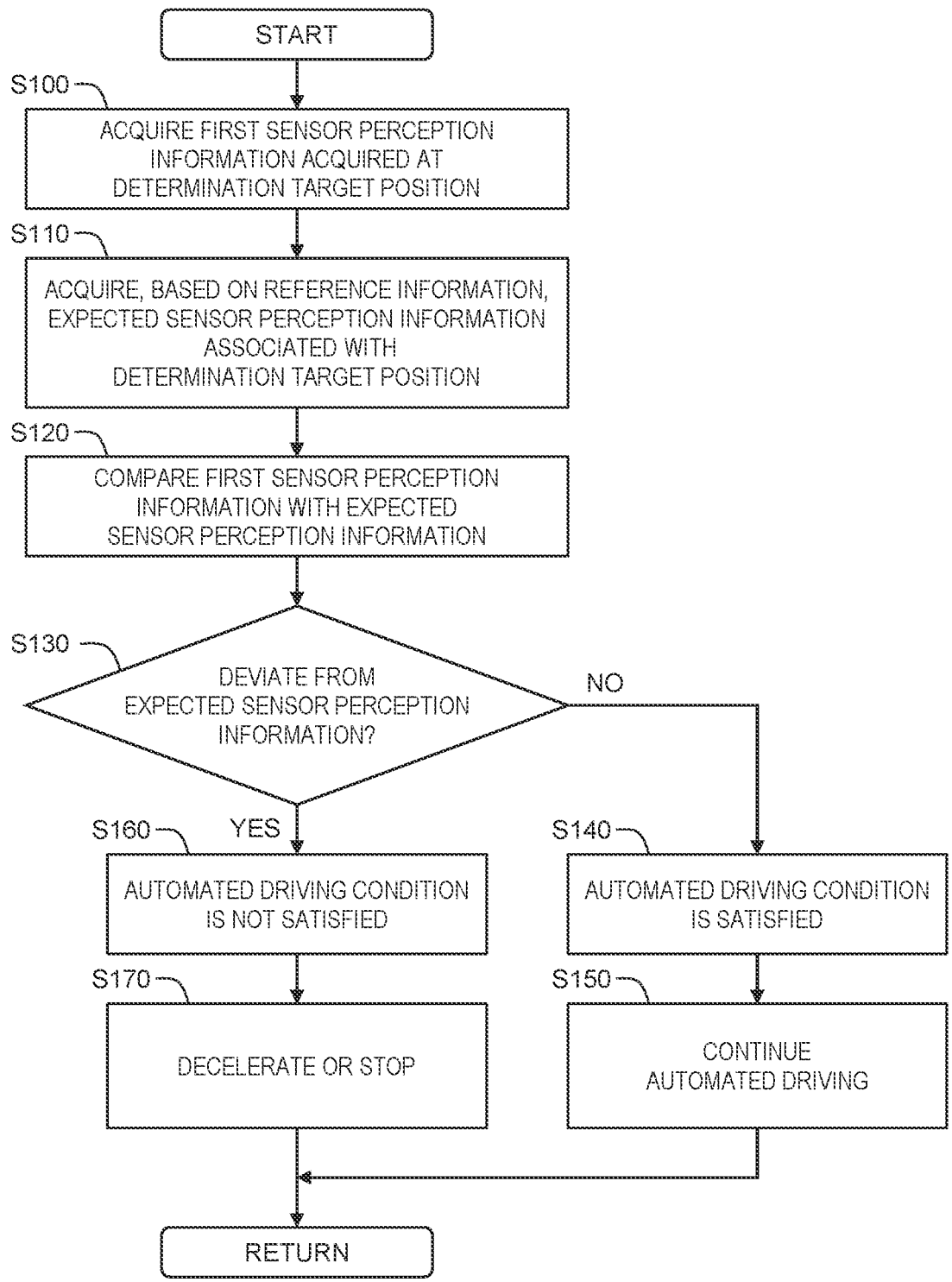
FIG. 9 is a flowchart showing an example of processing by an automated driving management system according to an embodiment of the present disclosure.

FIG. 9 is a flowchart showing an example of processing performed by the automated driving management system 100 (the processor 120) according to the present embodiment.

In Step S100, the processor 120 acquires the vehicle position information 240 and the first sensor perception information SEN1. The vehicle position information 240 includes information on the determination target position PT. Typically, the determination target position PT is a current position of the vehicle 1. As another example, the determination target position PT may be a past position of the vehicle 1. The first sensor perception information SEN1 indicates the result of perception by the perception sensor 30 mounted on the vehicle 1. For example, the first sensor perception information SEN1 includes the actual value Xa of the parameter X perceived by the perception sensor 30. The processor 120 acquires the first sensor perception information SEN1 acquired at the determination target position PT.

In Step S110, the processor 120 acquires, based on the reference information REF, the expected sensor perception information ESEN associated with the determination target position PT. For example, the expected sensor perception information ESEN includes the expected value Xe of the parameter X expected when the automated driving condition is satisfied.

In Step S120, the processor 120 compares the first sensor perception information SEN1 acquired at the determination target position PT with the expected sensor perception information ESEN associated with the determination target position PT.

When the first sensor perception information SEN1 acquired at the determination target position PT does not deviate from the expected sensor perception information ESEN (Step S130; No), the processing proceeds to Step S140. For example, when the actual value Xa of the parameter X acquired at the determination target position PT is within the allowable range RNG including the expected value Xe (Step S130; No), the processing proceeds to Step S140.

In Step S140, the processor 120 determines that the automated driving condition is satisfied at the determination target position PT. In this case, the processor 120 makes the automated driving of the vehicle 1 continue (Step S150).

On the other hand, when the first sensor perception information SEN1 acquired at the determination target position PT deviates from the expected sensor perception information ESEN (Step S130; Yes), the processing proceeds to Step S160. For example, when the actual value Xa of the parameter X acquired at the determination target position PT deviates from the allowable range RNG including the expected value Xe (Step S130; Yes), the processing proceeds to Step S160.

In Step S160, the processor 120 determines that the automated driving condition is not satisfied at the determination target position PT. In this case, the processor 120 makes the vehicle 1 decelerate or stop (Step S170).

4. Various Examples of Odd Suitability Determination Process

Hereinafter, various examples of the ODD suitability determination process according to the present embodiment will be described.

4-1. First Example

In a first example, the perception sensor 30 includes the LIDAR 31, and the first sensor perception information SEN1 includes the point cloud information 231 indicating the result of measurement by the LIDAR 31. The point cloud information 231 indicates the relative position (the azimuth and the distance) of each beam reflection point viewed from the LIDAR 31.

Figure 10:
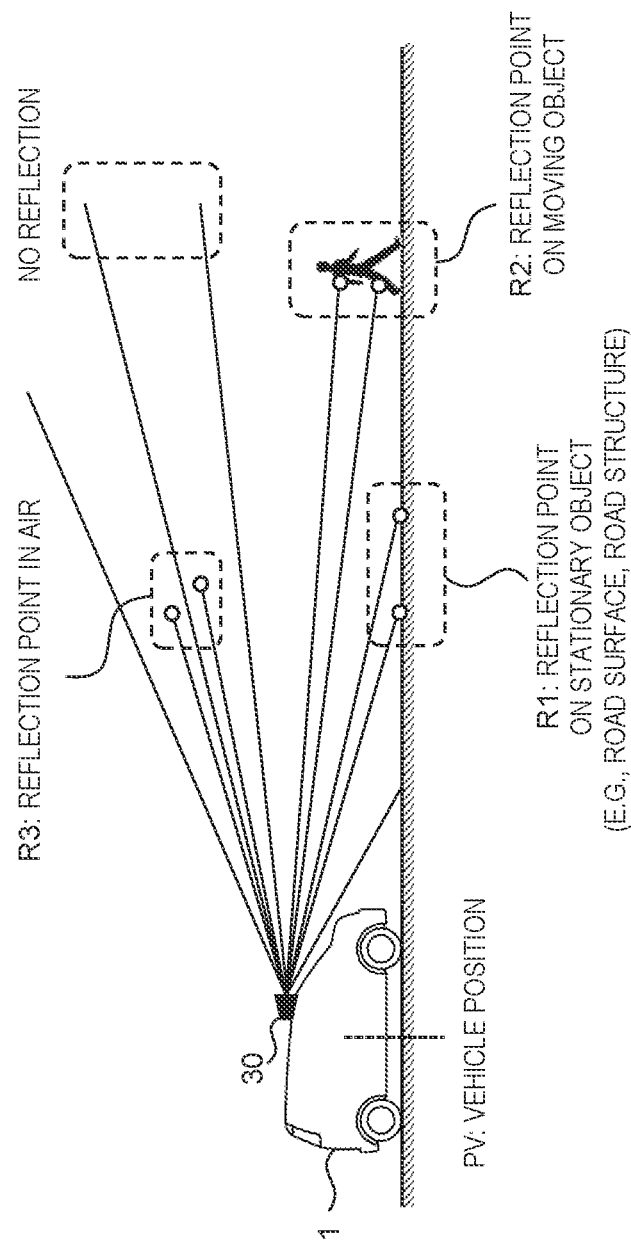
FIG. 10 is a conceptual diagram for explaining an example of point cloud information according to an embodiment of the present disclosure.

FIG. 10 is a conceptual diagram for explaining an example of the point cloud information 231. A first reflection point R1 is the reflection point on the stationary object (e.g., the road surface 2, the road structure 3). A second reflection point R2 is the reflection point on the moving object (e.g., the surrounding vehicle 4, the pedestrian 5). A noise reflection point R3 is the reflection point caused by raindrops or dust in air.

The first reflection point R1 is detected spatially continuously over a certain range. The second reflection point R2 also is detected spatially continuously over a certain range. That is, the spatially continuous point cloud is constituted by the first reflection point R1 or the second reflection point R2. Here, the above-described stationary object map information 215 indicates the absolute position where the stationary object is present. Combining the stationary object map information 215 and the vehicle position information 240 makes it possible to grasp the position at which the stationary object is assumed to be present around the vehicle 1. Therefore, the processor 120 is able to classify the spatially continuous point cloud into the first reflection point R1 and the second reflection point R2 based on the stationary object map information 215 and the vehicle position information 240. In other words, the processor 120 is able to distinguish between the first reflection point R1 regarding the stationary object and the second reflection point R2 regarding the moving object. In addition, when the stationary object map information 215 includes at least one of the terrain map information and the road structure map information, it is also possible to distinguish between the first reflection point R1 regarding the road surface 2 and the first reflection point R1 regarding the road structure 3.

On the other hand, the noise reflection points R3 are not spatially continuous. Typically, each noise reflection point R3 exists alone. Therefore, the processor 120 is able to recognize the noise reflection point R3 based on continuity of the point cloud. For example, assume a case where distances to a plurality of reflection points detected in a certain area are 19.8 m, 20.0 m, 5.5 m, 20.2 m, and 20.1 m. In this case, the reflection point whose distance is 5.5 m is the noise reflection point R3. For example, the processor 120 classifies a discontinuous reflection point whose distance difference from a reflection point for an adjacent beam is equal to or greater than a predetermined value as the noise reflection point R3.

It is assumed that the number of beams emitted from the LIDAR 31 during one frame is "N." A number n_t is the number of the first reflection points R1 that are measured during one frame. A number n_s is the number of the second reflection points R2 that are measured during one frame. A number n_n is the number of noise reflection points R3 that are measured during one frame. A number of no-reflection points m is the number of beams for which the reflected beam is not detected during one frame. In this case, a relationship represented by the following Equation (1) is satisfied.

$$N = n\_t + n\_s + n\_n + m \quad \text{Equation (1):}$$

The first sensor perception information SEN1 includes at least one of the number of first reflection points n_t, the number of noise reflection points n_n, and the number of no-reflection points m. The first sensor perception information SEN1 may include at least the number of first reflection points n_t. The first sensor perception information SEN1 may include all of the number of first reflection points n_t, the number of noise reflection points n_n, and the number of no-reflection points m.

On the other hand, the first sensor perception information SEN1 may not include the number of second reflection points n_s regarding the moving object. To generalize, second sensor perception information is information on the moving object perceived by the perception sensor 30. The second sensor perception information is necessary for the automated driving control by the vehicle control system 10, but may not necessarily be included in the first sensor perception information SEN1.

Figure 11:
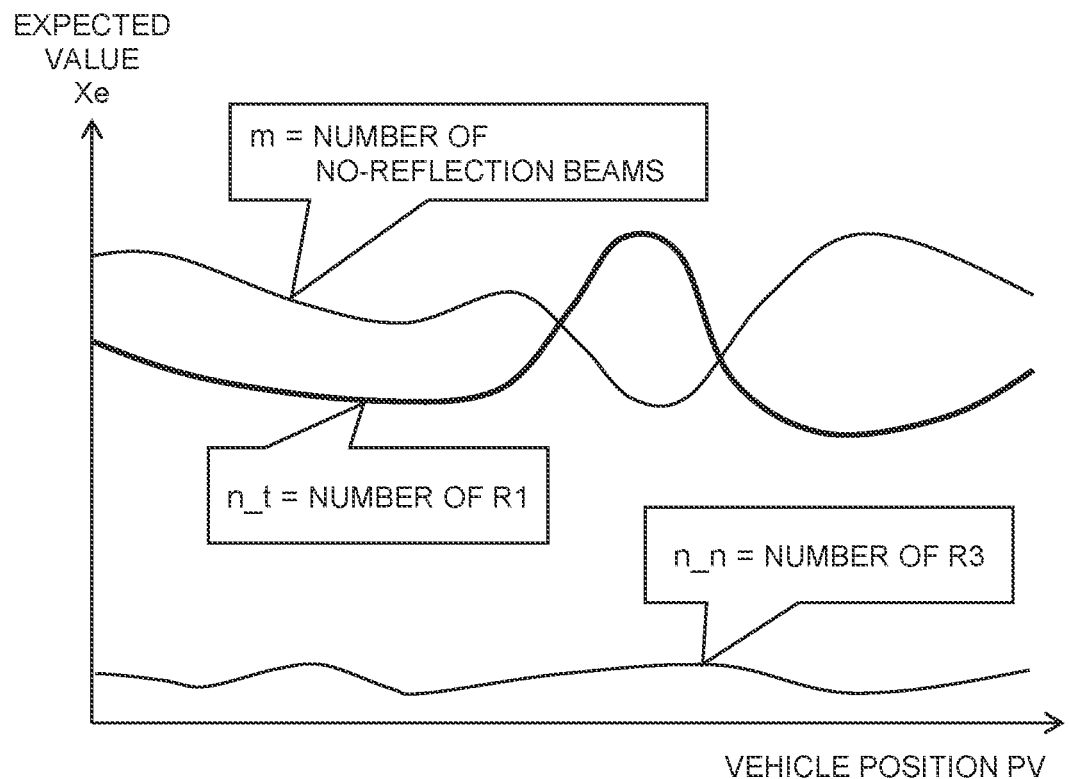
FIG. 11 is a conceptual diagram for explaining an example of reference information according to an embodiment of the present disclosure.

FIG. 11 is a conceptual diagram for explaining an example of the reference information REF. The reference information REF indicates a correspondence relationship between the expected value Xe of the parameter X and the vehicle position PV. That is, the reference information REF expresses the expected value Xe of the parameter X as a function of the vehicle position PV. In the example shown in FIG. 11, the parameter X includes the number of first reflection points n_t, the number of noise reflection points n_n, and the number of no-reflection points m.

As an example, the ODD suitability determination process in rainy weather will be described. A reflected beam on a diffusely-reflecting surface is highly likely to return back to the LIDAR 31, but a reflected beam on a totally-reflecting surface is not likely to return back to the LIDAR 31. Therefore, in rainy weather, the first reflection point R1 on the road surface 2 decreases. On the other hand, since raindrops in air increase, the noise reflection point R3 increases. That is to say, in rainy weather, the number of first reflection points n_t conspicuously decreases, while the number of noise reflection points n_n conspicuously increases. In addition, the number of no-reflection points m increases as the number of first reflection points n_t decreases.

When the number of first reflection points n_t on the road surface 2 decreases, it becomes difficult to detect a fallen object on the road surface 2. Further, when the number of noise reflection points n_n increases, it becomes difficult to detect a distant object. That is, in the rainy weather, object detection performance is deteriorated and thus the accuracy of the automated driving control is deteriorated. Therefore, it is desirable to perform the ODD suitability determination process with high accuracy.

Figure 12:
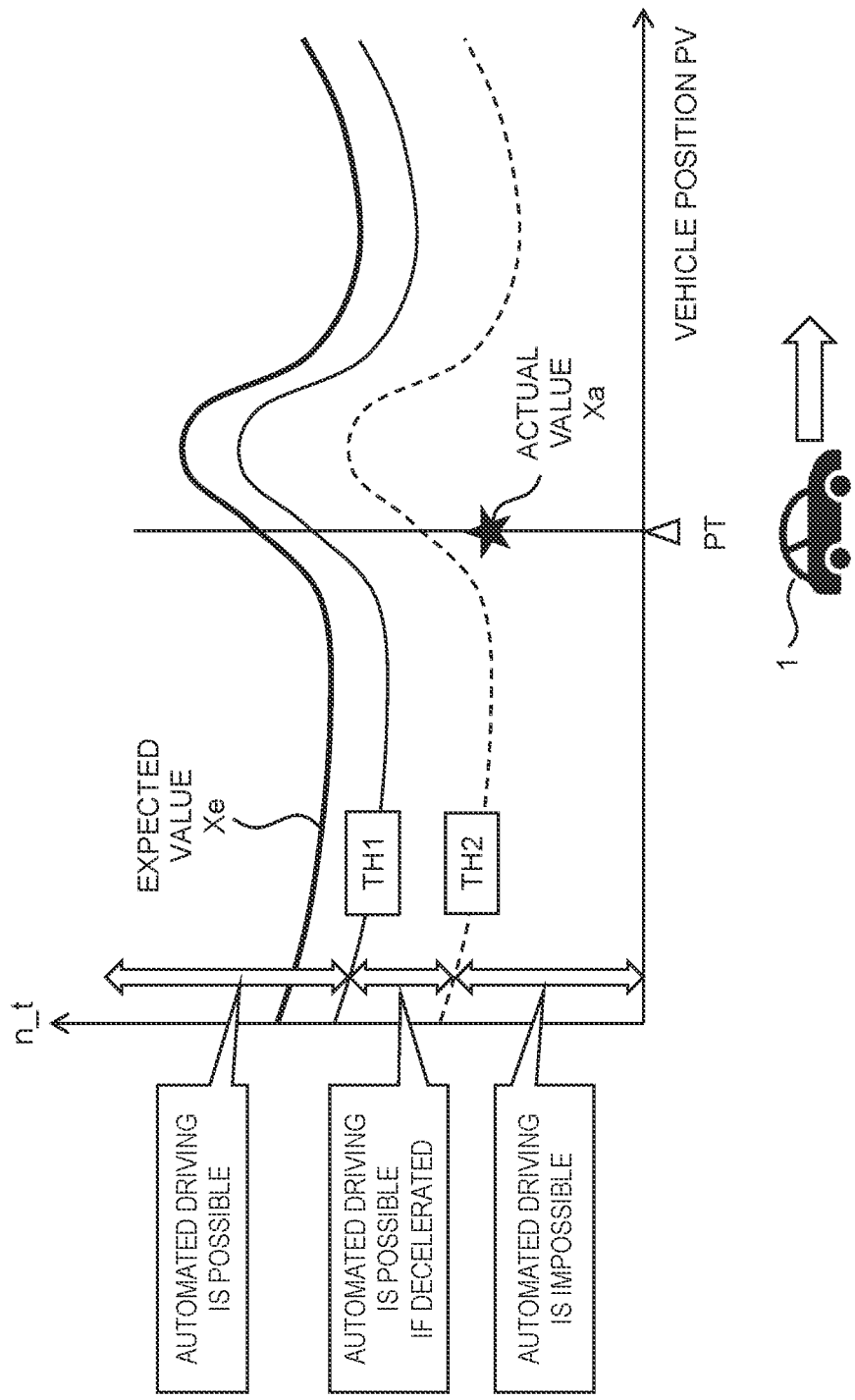
FIG. 12 is a conceptual diagram for explaining an example of an ODD suitability determination process according to an embodiment of the present disclosure.

FIG. 12 is a conceptual diagram for explaining the ODD suitability determination process using the number of first reflection points n_t. A vertical axis represents the number of first reflection points n_t, and a horizontal axis represents the vehicle position PV. The reference information REF indicates a correspondence relationship between the expected value Xe of the number of first reflection points n_t and the vehicle position PV. That is, the reference information REF expresses the expected value Xe of the number of first reflection points n_t as a function of the vehicle position PV.

In the example shown in FIG. 12, a first threshold value TH1 defines a lower limit value of the number of first reflection points n_t that allows to continue the automated driving (e.g., LV4 automated driving) without deceleration. The first threshold value TH1 is set to be lower than the expected value Xe. A second threshold value TH2 defines a lower limit value of the number of first reflection points n_t that allows to continue the automated driving if decelerated. The second threshold value TH2 is set to be further lower than the first threshold value TH1. The first threshold value TH1 and the second threshold value TH2 may be registered on the reference information REF together with the expected value Xe.

The processor 120 acquires the first sensor perception information SEN1 acquired at the determination target position PT. The first sensor perception information SEN1 includes the actual value Xa of the number of first reflection points n_t acquired at the determination target position PT. Based on the reference information REF, the processor 120 acquires the expected value Xe associated with the determination target position PT. When the actual value Xa of the number of first reflection points n_t is equal to or greater than the first threshold value TH1, the processor 120 determines that the automated driving condition is satisfied and the automated driving is possible. When the actual value Xa of the number of first reflection points n_t is less than the first threshold value TH1 and equal to or greater than the second threshold value TH2, the processor 120 determines that the automated driving is possible if decelerated. When the actual value Xa of the number of first reflection points n_t is less than the second threshold value TH2, the processor 120 determines that the automated driving condition is not satisfied and the automated driving is not possible.

Figure 13:
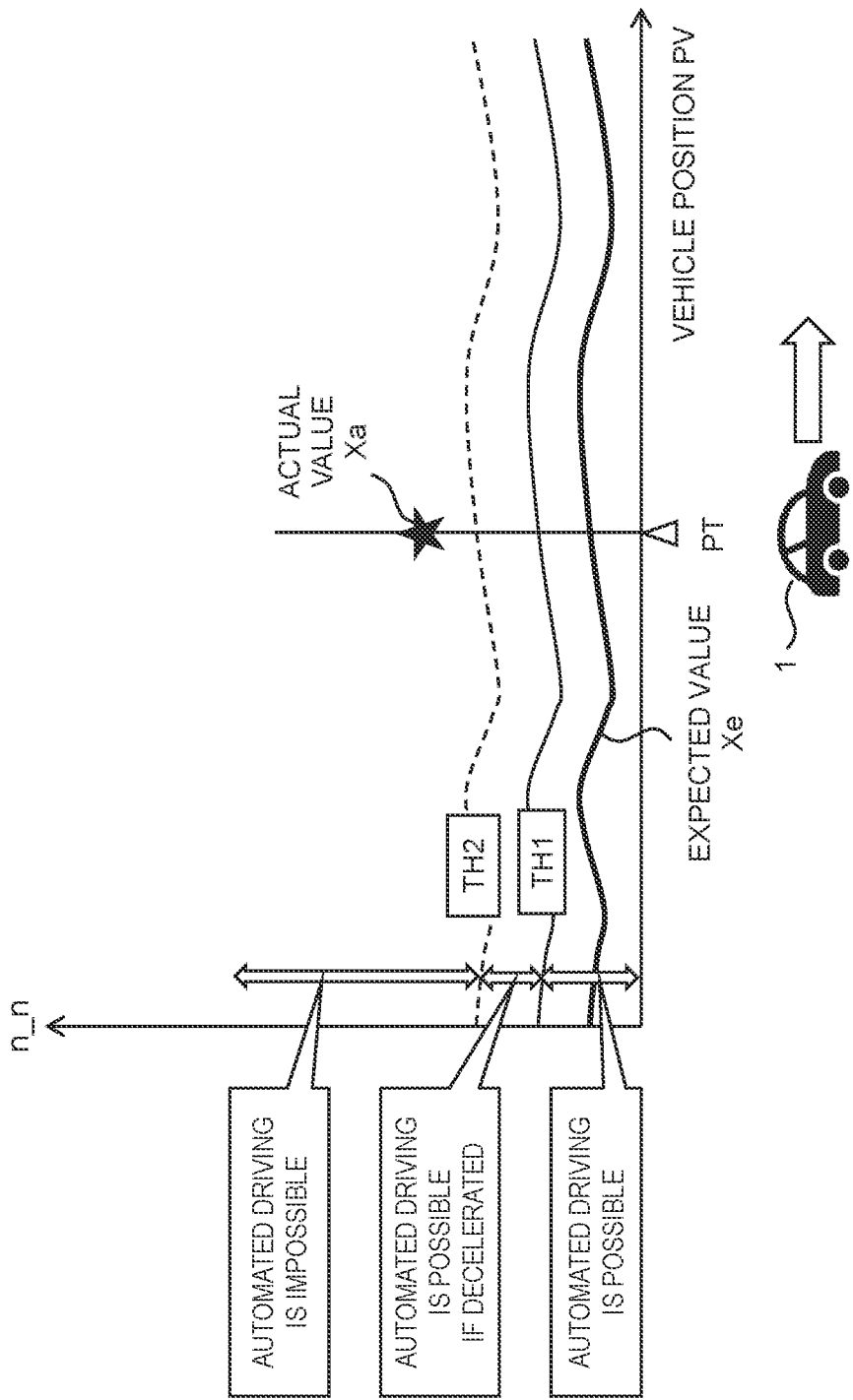
FIG. 13 is a conceptual diagram for explaining another example of an ODD suitability determination process according to an embodiment of the present disclosure.

FIG. 13 is a conceptual diagram for explaining the ODD suitability determination process using the number of noise reflection points n_n. A vertical axis represents the number of noise reflection points n_n, and a horizontal axis represents the vehicle position PV. The reference information REF indicates a correspondence relationship between the expected value Xe of the number of noise reflection points n_n and the vehicle position PV. That is, the reference information REF expresses the expected value Xe of the number of noise reflection points n_n as a function of the vehicle position PV.

In the example shown in FIG. 13, a first threshold value TH1 defines an upper limit value of the number of noise reflection points n_n that allows to continue the automated driving (e.g., LV4 automated driving) without deceleration. The first threshold value TH1 is set to be higher than the expected value Xe. A second threshold value TH2 defines an upper limit value of the number of noise reflection points n_n that allows to continue the automated driving if decelerated. The second threshold value TH2 is set to be further higher than the first threshold value TH1. The first threshold value TH1 and the second threshold value TH2 may be registered on the reference information REF together with the expected value Xe.

The processor 120 acquires the first sensor perception information SEN1 acquired at the determination target position PT. The first sensor perception information SEN1 includes the actual value Xa of the number of noise reflection points n_n acquired at the determination target position PT. Based on the reference information REF, the processor 120 acquires the expected value Xe associated with the determination target position PT. When the actual value Xa of the number of noise reflection points n_n is equal to or less than the first threshold value TH1, the processor 120 determines that the automated driving condition is satisfied and the automated driving is possible. When the actual value Xa of the number of noise reflection points n_n exceeds the first threshold value TH1 and is equal to or less than the second threshold value TH2, the processor 120 determines that the automated driving is possible if decelerated. When the actual value Xa of the number of noise reflection points n_n exceeds the second threshold value TH2, the processor 120 determines that the automated driving condition is not satisfied and the automated driving is not possible.

When the first sensor perception information SEN1 includes the number of first reflection points n_t and the number of noise reflection points n_n, the processor 120 performs both the ODD suitability determination process shown in FIG. 12 and the ODD suitability determination process shown in FIG. 13. Then, the processor 120 adopts the determination result in which the traveling of the vehicle 1 is more restricted, that is, the vehicle speed is lower.

4-2. Second Example

In a second example, fog is considered. In the case of fog, the number of water droplets in the air increases greatly.

Therefore, the number of noise reflection points n_n is greatly increased. In addition, the number of no-reflection points m decreases as the number of noise reflection points n_n increases. On the other hand, the number of first reflection points n_t does not decrease so much. Therefore, using at least one of the number of noise reflection points n_n and the number of no-reflection points m makes it possible to appropriately perform the ODD suitability determination process. The ODD suitability determination process is the same as that in the first example described above.

It should be noted that a tendency of variation in the number of reflection points is different between the case of rain and the case of fog. Therefore, it is also possible to estimate a cause of the fact that the automated driving condition is not satisfied, based on the tendency of variation in the number of reflection points.

4-3. Third Example

In a third example, a case where an output of the LIDAR 31 is reduced is considered. The reduction in the output of the LIDAR 31 occurs due to aging, failure, heat, or the like. When the output of the LIDAR 31 is reduced, the number of reflection points decreases as a whole. Especially, the number of the first reflection points R1 on a distant road surface 2 is greatly reduced. Therefore, in the third example, the first reflection points R1 on the road surface 2 are further classified from a viewpoint of the distance from the vehicle 1.

Figure 14:
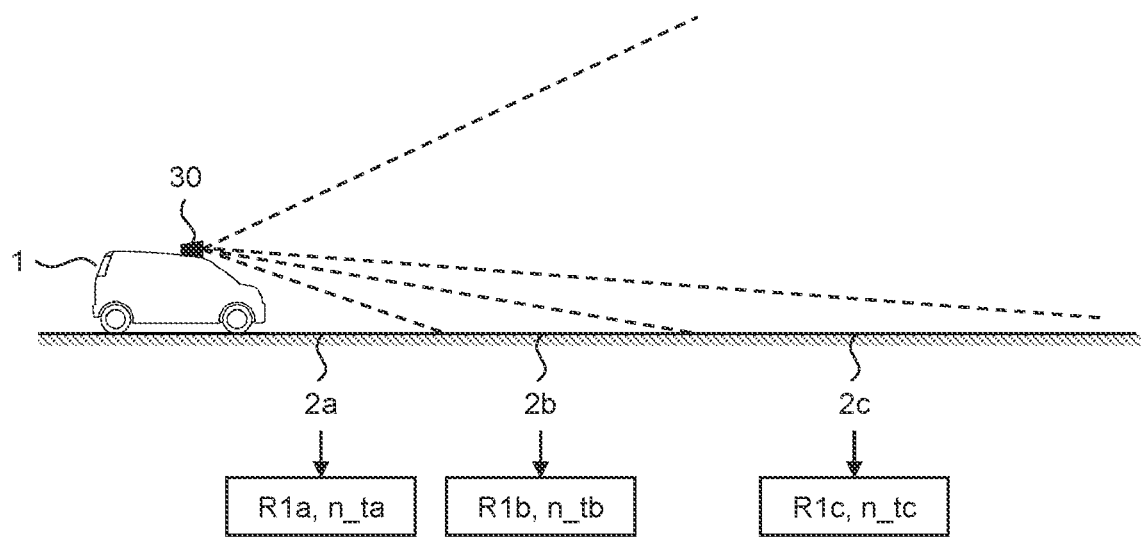
FIG. 14 is a conceptual diagram for explaining still another example of an ODD suitability determination process according to an embodiment of the present disclosure.

For example, as shown in FIG. 14, the road surface 2 is divided into three types: a short-distance road surface 2a, a medium-distance road surface 2b, and a long-distance road surface 2c. The processor 120 classifies the first reflection points R1 on the road surface 2 into first reflection points R1a on the road surface 2a, first reflection points R1b on the road surface 2b, and first reflection points R1c on the road surface 2c based on the distances to the measured reflection points. Numbers of first reflection points n_ta, n_tb, and n_tc are the numbers of first reflection points R1a, R1b, and R1c, respectively.

The first sensor perception information SEN1 includes the numbers of first reflection points n_ta, n_tb, and n_tc. The reference information REF indicates respective expected values Xe of the numbers of first reflection points n_ta, n_tb, and n_tc. The processor 120 performs the ODD suitability determination process by using the numbers of first reflection points n_ta, n_tb, and n_tc. As a result, even when the output of the LIDAR 31 is reduced, the ODD suitability determination process can be appropriately performed. Furthermore, it is also possible to estimate that the cause of the fact that the automated driving condition is not satisfied is the reduction in the output of the LIDAR 31.

4-4. Fourth Example

In a fourth example, a case where calibration of the LIDAR 31 is deteriorated is considered. As described above, the first reflection point R1 on the road structure 3 can be identified by using the road structure map information included in the stationary object map information 215. However, when the calibration of the LIDAR 31 is deteriorated, accuracy of the identification of the first reflection point R1 using the road structure map information decreases. As a result, the number of first reflection points R1 on the road structure 3 decreases. Therefore, it is possible to appropriately perform the ODD suitability determination process by using the number of first reflection points n_t regarding the road structure 3. The ODD suitability determination process is the same as that in the first example described above.

4-5. Fifth Example

In a fifth example, the number of landmarks perceived in the localization (see FIG. 7) is considered. Examples of the landmark include a white line, a curb, a sign, a pole, and the like. The result of perception of the landmark using the perception sensor 30 is acquired from the object information 233. For example, in rainy weather, the number of detection of the landmarks is reduced. Especially, the white line, which is detected based on luminance value, becomes hard to detect when the road surface 2 is wet. As another example, in a case of snow, the numbers of detection of the white line and the curb are significantly reduced.

Therefore, in the fifth example, the ODD suitability determination process is performed by using the number of landmarks perceived by the perception sensor 30. The first sensor perception information SEN1 includes the number of landmarks perceived by using the perception sensor 30. The reference information REF indicates an expected value Xe of the number of each landmark. The processor 120 performs the ODD suitability determination process by using the number of each landmark.

Figure 15:
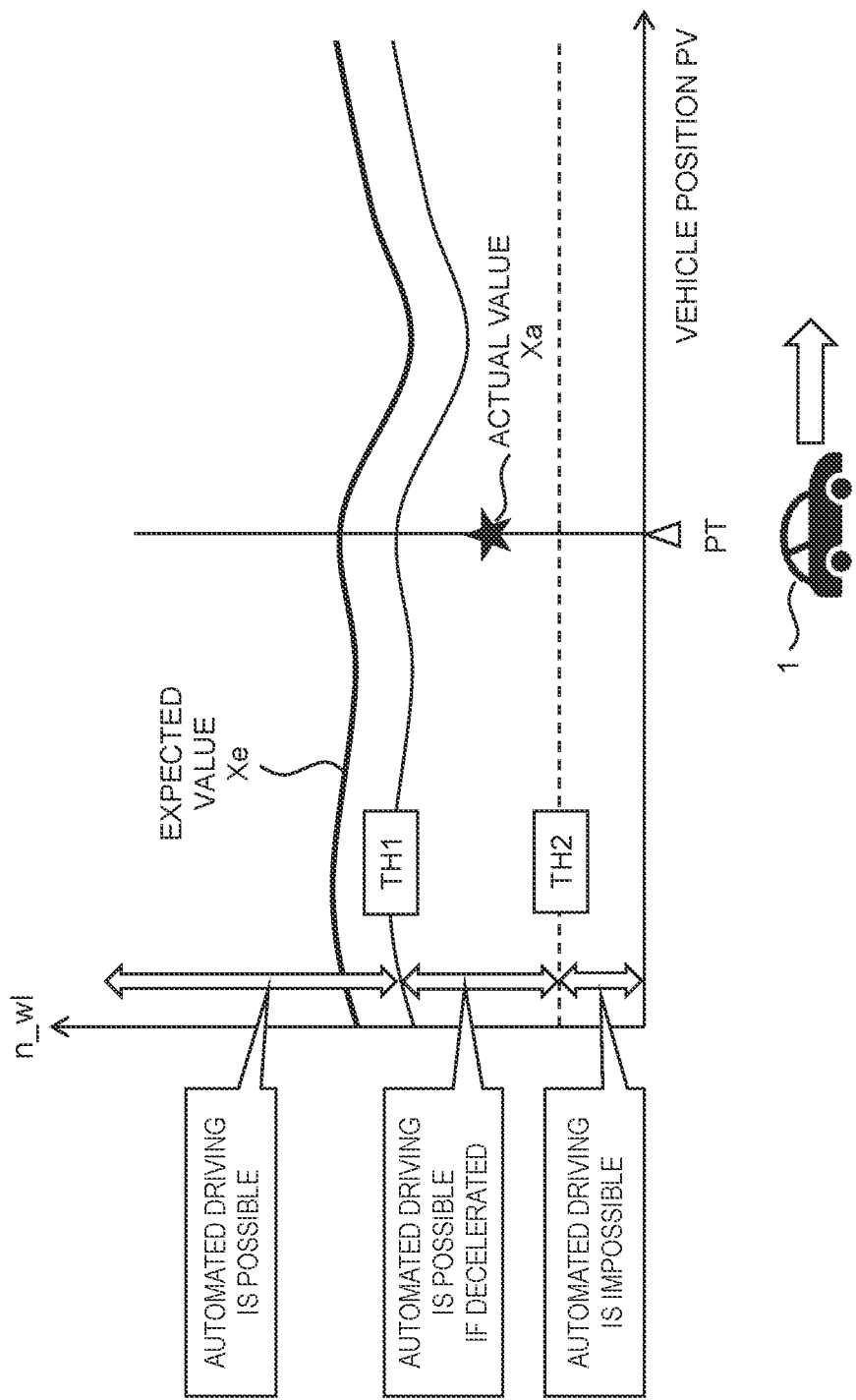
FIG. 15 is a conceptual diagram for explaining still another example of an ODD suitability determination process according to an embodiment of the present disclosure.

FIG. 15 is a conceptual diagram for explaining the ODD suitability determination process using the number of white lines n_wl. A vertical axis represents the number of white lines n_wl, and a horizontal axis represents the vehicle position PV. The reference information REF indicates a correspondence relationship between the expected value Xe of the number of white lines n_wl and the vehicle position PV. That is, the reference information REF expresses the expected value Xe of the number of white lines n_wl as a function of the vehicle position PV.

In the example shown in FIG. 15, a first threshold value TH1 defines a lower limit value of the number of white lines n_wl that allows to continue the automated driving (e.g., LV4 automated driving) without deceleration. The first threshold TH1 is set to be lower than the expected value Xe. A second threshold value TH2 defines a lower limit value of the number of white lines n_wl that allows to continue the automated driving if decelerated. The second threshold value TH2 is set to be further lower than the first threshold value TH1. The first threshold value TH1 and the second threshold value TH2 may be registered on the reference information REF together with the expected value Xe.

The processor 120 acquires the first sensor perception information SEN1 acquired at the determination target position PT. The first sensor perception information SEN1 includes the actual value Xa of the number of white lines n_wl acquired at the determination target position PT. Based on the reference information REF, the processor 120 acquires the expected value Xe associated with the determination target position PT. When the actual value Xa of the number of white lines n_wl is equal to or greater than the first threshold value TH1, the processor 120 determines that the automated driving condition is satisfied and the automated driving is possible. When the actual value Xa of the number of white lines n_wl is less than the first threshold value TH1 and equal to or greater than the second threshold value TH2, the processor 120 determines that the automated driving is possible if decelerated. When the actual value Xa of the white line number n_wl is less than the second threshold value TH2, the processor 120 determines that the automated driving condition is not satisfied and the automated driving is not possible.

4-6. Sixth Example

Figure 16:
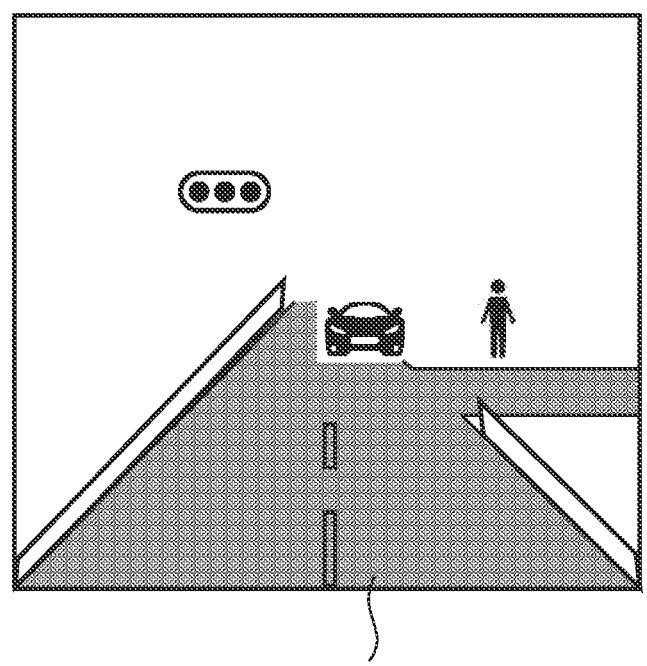
FIG. 16 is a conceptual diagram for explaining still another example of an ODD suitability determination process according to an embodiment of the present disclosure.

FIG. 16 is a conceptual diagram for explaining a sixth example. In the sixth example, the image (image information 232) captured by the camera 32 is considered. The processor 120 can extract the road surface 2 in the image by analyzing the image captured by the camera 32. For example, the processor 120 can extract the road surface 2 in the image by applying semantic segmentation to the image. The segmentation (region division) is a technique of grouping regions having similar feature amounts (color, texture, or the like) in the image to divide the image into a plurality of regions.

Quality (visibility) of the image captured by the camera greatly varies depending on an imaging condition. For example, in rainy weather, the image quality is deteriorated. As another example, if a lens of camera 32 is dirty, the image quality is deteriorated. As still another example, at night, the image quality is deteriorated due to insufficient light intensity. When the image quality of the image is deteriorated, object detection performance based on the image is deteriorated and thus the accuracy of the automated driving control is deteriorated. Therefore, it is desirable to perform the ODD suitability determination process with high accuracy.

As described above, the processor 120 extracts the road surface 2 in the image by analyzing the image captured by the camera 32. However, when the image quality of the image is deteriorated, an area of the road surface 2 to be extracted decreases. Therefore, in the sixth example, the ODD suitability determination process is performed by using an area ratio of the road surface 2 in the image. The first sensor perception information SEN1 includes the area ratio of the road surface 2 in the image. The reference information REF indicates the expected value Xe of the area ratio of the road surface 2 in the image. The processor 120 performs the ODD suitability determination process by using the area ratio of the road surface 2 in the image. The ODD suitability determination process is the same as that in the fifth example described above.

What is claimed is:

1. An automated driving management system applied to a vehicle that performs automated driving by using a perception sensor for perceiving a surrounding situation, the automated driving management system comprising:
   one or more processors configured to acquire first sensor perception information indicating a result of perception by the perception sensor; and
   one or more memory devices configured to store reference information indicating a correspondence relationship between a vehicle position and expected sensor perception information that is the first sensor perception information expected when an automated driving condition is satisfied, wherein the one or more processors are further configured to:
   acquire, based on the reference information, the expected sensor perception information associated with a determination target position;
   determine whether or not the automated driving condition is satisfied at the determination target position by comparing the first sensor perception information acquired at the determination target position with the expected sensor perception information associated with the determination target position; and
   perform the automated driving in response to determining whether the automated driving condition is satisfied, wherein:
   the perception sensor includes a laser imaging detection and ranging,
   the first sensor perception information includes a result of measurement by the laser imaging detection and ranging,
   the laser imaging detection and ranging emits beams and detects a reflected beam reflected at a reflection point to measure a relative position of the reflection point,
   a number of first reflection points is a number of reflection points on a stationary object that are measured during one frame,
   a number of noise reflection points is a number of reflection points in air that are measured during the one frame,
   a number of no-reflection points is a number of beams for which the reflected beam is not detected during the one frame,
   the first sensor perception information includes at least one of the number of first reflection points, the number of noise reflection points, and the number of no-reflection points,
   a first reflection point corresponds to a reflection point on the stationary object of a road surface or a road structure, a second reflection point corresponds to a reflection point on a moving object of a surrounding vehicle or a pedestrian; and a third reflection point corresponds to a reflection point caused by raindrops or dust in the air,
   of the first, second, and third reflection points, the first and second reflection points are detected spatially continuously, and
   the one or more processors are further configured to classify a discontinuous reflection point whose distance difference from a reflection point for an adjacent beam is equal to or greater than a predetermined value as the third reflection point.

2. The automated driving management system according to claim 1, wherein
   the first sensor perception information includes a parameter indicating the result of perception by the perception sensor,
   the expected sensor perception information includes an expected value of the parameter expected when the automated driving condition is satisfied,
   the reference information indicates a correspondence relationship between the expected value of the parameter and the vehicle position, and
   the one or more processors are further configured to:
   acquire, based on the reference information, the expected value associated with the determination target position;
   compare an actual value of the parameter acquired at the determination target position with an allowable range including the expected value associated with the determination target position; and
   when the actual value of the parameter acquired at the determination target position deviates from the allowable range, determine that the automated driving condition is not satisfied at the determination target position.

3. The automated driving management system according to claim 1, wherein
   the first sensor perception information includes information on the stationary object perceived by the perception sensor.

4. The automated driving management system according to claim 3, wherein
   second sensor perception information is information on the moving object perceived by the perception sensor, and
   the second sensor perception information is not included in the first sensor perception information.

5. The automated driving management system according to claim 1, wherein
   a parameter includes the at least one of the number of first reflection points, the number of noise reflection points, and the number of no-reflection points included in the first sensor perception information,
   the expected sensor perception information includes an expected value of the parameter expected when the automated driving condition is satisfied,
   the reference information indicates a correspondence relationship between the expected value of the parameter and the vehicle position, and the one or more processors are further configured to:
   acquire, based on the reference information, the expected value associated with the determination target position;
   compare an actual value of the parameter acquired at the determination target position with an allowable range including the expected value associated with the determination target position; and
   when the actual value of the parameter acquired at the determination target position deviates from the allowable range, determine that the automated driving condition is not satisfied at the determination target position.

6. The automated driving management system according to claim 1, wherein the one or more processors are further configured to:
   perceive a landmark around the vehicle by using the perception sensor; and
   estimate a position of the vehicle based on a result of perception of the landmark and map information indicating a position of the landmark, and
   the first sensor perception information includes a number of landmarks perceived by using the perception sensor.

7. The automated driving management system according to claim 1, wherein
   the perception sensor includes a camera that images a situation around the vehicle,
   the one or more processors are further configured to analyze an image captured by the camera to extract the road surface in the image; and
   the first sensor perception information includes an area ratio of the road surface in the image.

8. An automated driving management method applied to a vehicle that performs automated driving by using a perception sensor for perceiving a surrounding situation, and reference information indicates a correspondence relationship between a vehicle position and expected sensor perception information that is the first sensor perception information expected when an automated driving condition is satisfied, the automated driving management method comprising:
   acquiring, based on the reference information, the expected sensor perception information associated with a determination target position;
   determining whether or not the automated driving condition is satisfied at the determination target position by comparing the first sensor perception information acquired at the determination target position with the expected sensor perception information associated with the determination target position; and
   performing the automated driving in response to determining whether the automated driving condition is satisfied, wherein:
   the perception sensor includes a laser imaging detection and ranging,
   the first sensor perception information includes a result of measurement by the laser imaging detection and ranging,
   the laser imaging detection and ranging emits beams and detects a reflected beam reflected at a reflection point to measure a relative position of the reflection point,
   a number of first reflection points is a number of reflection points on a stationary object that are measured during one frame,
   a number of noise reflection points is a number of reflection points in air that are measured during the one frame,
   a number of no-reflection points is a number of beams for which the reflected beam is not detected during the one frame,
   the first sensor perception information includes at least one of the number of first reflection points, the number of noise reflection points, and the number of no-reflection points,
   a first reflection point corresponds to a reflection point on the stationary object of a road surface or a road structure, a second reflection point corresponds to a reflection point on a moving object of a surrounding vehicle or a pedestrian; and a third reflection point corresponds to a reflection point caused by raindrops or dust in the air,
   of the first, second, and third reflection points, the first and second reflection points are detected spatially continuously, and
   the automated driving management method further comprises classifying a discontinuous reflection point whose distance difference from a reflection point for an adjacent beam is equal to or greater than a predetermined value as the third reflection point.

9. The automated driving management system according to claim 6, wherein:
   the map information comprises stationary object map information including a latitude, a longitude, and an altitude indicative of where the road surface is present,
   the stationary object map information includes terrain map information including an evaluation value for each absolute position, the evaluation value being indicative of a likelihood that the road surface is present at the absolute position, and
   the one or more processors are further configured to distinguish between the first reflection point regarding the road surface and the first reflection point regarding the road structure in response to the stationary object map information including the terrain map information.

10. An automated driving management system applied to a vehicle that performs automated driving by using a perception sensor for perceiving a surrounding situation, the automated driving management system comprising:
   one or more processors configured to acquire first sensor perception information indicating a result of perception by the perception sensor; and
   one or more memory devices configured to store reference information indicating a correspondence relationship between a vehicle position and expected sensor perception information that is the first sensor perception information expected when an automated driving condition is satisfied, wherein the one or more processors are further configured to:

acquire, based on the reference information, the expected sensor perception information associated with a determination target position;

determine whether or not the automated driving condition is satisfied at the determination target position by comparing the first sensor perception information acquired at the determination target position with the expected sensor perception information associated with the determination target position; and perform the automated driving in response to determining whether the automated driving condition is satisfied, wherein:

the perception sensor includes a laser imaging detection and ranging, the first sensor perception information includes a result of measurement by the laser imaging detection and ranging, the laser imaging detection and ranging emits beams and detects a reflected beam reflected at a reflection point to measure a relative position of the reflection point, a number of first reflection points is a number of reflection points on a stationary object that are measured during one frame, a number of noise reflection points is a number of reflection points in air that are measured during the one frame, a number of no-reflection points is a number of beams for which the reflected beam is not detected during the one frame, the first sensor perception information includes at least one of the number of first reflection points, the number of noise reflection points, and the number of no-reflection points, a first reflection point corresponds to a reflection point on the stationary object of a road surface or a road structure, a second reflection point corresponds to a reflection point on a moving object of a surrounding vehicle or a pedestrian; and a third reflection point corresponds to a reflection point caused by raindrops or dust in the air, of the first, second, and third reflection points, the first and second reflection points are detected spatially continuously, the one or more processors are further configured to:

perceive a landmark around the vehicle by using the perception sensor; and estimate a position of the vehicle based on a result of perception of the landmark and map information indicating a position of the landmark, and the first sensor perception information includes a number of landmarks perceived by using the perception sensor, the map information comprises stationary object map information including a latitude, a longitude, and an altitude indicative of where the road surface is present, the stationary object map information includes terrain map information including an evaluation value for each absolute position, the evaluation value being indicative of a likelihood that the road surface is present at the absolute position, and the one or more processors are further configured to distinguish between the first reflection point regarding the road surface and the first reflection point regarding the road structure in response to the stationary object map information including the terrain map information.

\* \* \* \* \*